(12) United States Patent
Uchiyama et al.

(10) Patent No.: US 10,844,973 B2
(45) Date of Patent: Nov. 24, 2020

(54) LIQUID ELECTROMAGNETIC VALVE, METHOD OF MANUFACTURING LIQUID ELECTROMAGNETIC VALVE, AND WASHING MACHINE

(71) Applicant: TOSHIBA LIFESTYLE PRODUCTS & SERVICES CORPORATION, Kawasaki (JP)

(72) Inventors: Tomonori Uchiyama, Kawasaki (JP); Hidetake Hayashi, Kawasaki (JP); Masami Hattori, Kawasaki (JP)

(73) Assignee: TOSHIBA LIFESTYLE PRODUCTS & SERVICES CORPORATION, Kawasaki (JP)

( * ) Notice: Subject to any disclaimer, the term of this patent is extended or adjusted under 35 U.S.C. 154(b) by 195 days.

(21) Appl. No.: 15/880,646

(22) Filed: Jan. 26, 2018

(65) Prior Publication Data

US 2018/0149284 A1   May 31, 2018

Related U.S. Application Data

(63) Continuation of application No. PCT/JP2016/070004, filed on Jul. 6, 2016.

(30) Foreign Application Priority Data

Jul. 29, 2015 (JP) ................. 2015-149665

(51) Int. Cl.
*F16K 31/06* (2006.01)
*D06F 39/08* (2006.01)
(Continued)

(52) U.S. Cl.
CPC ........ *F16K 31/0655* (2013.01); *D06F 35/002* (2013.01); *D06F 39/08* (2013.01);
(Continued)

(58) Field of Classification Search
CPC ...... D06F 35/002; D06F 39/08; D06F 39/088; F16K 1/385; F16K 31/0655; F16K 31/385; F16K 47/08
See application file for complete search history.

(56) References Cited

U.S. PATENT DOCUMENTS 4,231,130 A * 11/1980 Tobita ............... D06F 33/02
68/12.19
2005/0166976 A1 * 8/2005 Folk ................. F16K 25/04
137/625.33
(Continued)

FOREIGN PATENT DOCUMENTS

CN         1899978 A    1/2007
CN       101384763 A    3/2009
(Continued)

OTHER PUBLICATIONS

Machine translation of JP 2011-240206 A to Sakamoto. (Year: 2011).*
(Continued)

*Primary Examiner* — Joseph L. Perrin
(74) *Attorney, Agent, or Firm* — Oblon, McClelland, Maier & Neustadt, L.L.P.

(57) ABSTRACT

A liquid electromagnetic valve includes an inlet connected to an external liquid source; an outlet discharging liquid entering from the inlet; a flow path forming member having a flow path connecting the inlet and the outlet formed thereto; an opening-closing member capable of opening and closing the flow path; a drive portion opening and closing the opening-closing member based on a control performed by an external element; and a minute bubble generator provided in the flow path and having plural narrowing portions for adding minute bubbles to a liquid passing through the flow path by narrowing the flow path in plural stages.

11 Claims, 16 Drawing Sheets

(51) Int. Cl.
  *F16K 47/08* (2006.01)
  *F16K 31/40* (2006.01)
  *D06F 35/00* (2006.01)
  *F16K 1/38* (2006.01)

(52) U.S. Cl.
  CPC ............ *D06F 39/088* (2013.01); *F16K 1/385* (2013.01); *F16K 31/408* (2013.01); *F16K 47/08* (2013.01)

(56) References Cited

U.S. PATENT DOCUMENTS

| | | | | |
|---|---|---|---|---|
| 2011/0289794 A1* | 12/2011 | Noh | ...................... | F26B 23/005 34/443 |
| 2012/0204607 A1* | 8/2012 | Yang | ..................... | D06F 35/002 68/5 R |
| 2012/0256329 A1* | 10/2012 | Katayama | ................ | A23C 9/15 261/36.1 |
| 2013/0153808 A1* | 6/2013 | Folk | ...................... | F16K 25/005 251/359 |
| 2014/0151470 A1* | 6/2014 | Katou | ................... | B01F 5/0663 239/589 |
| 2015/0176170 A1* | 6/2015 | Bae | ....................... | D06F 35/002 68/183 |

FOREIGN PATENT DOCUMENTS

| | | |
|---|---|---|
| CN | 204112111 U | 1/2015 |
| JP | 07-146032 | 6/1995 |
| JP | 7-146032 | 6/1995 |
| JP | 2001-347191 | 12/2001 |
| JP | 2001-347191 A | 12/2001 |
| JP | 2011-050675 | 3/2011 |
| JP | 2011-245405 | 12/2011 |
| JP | 2011240206 A * | 12/2011 |
| JP | 2013-085566 | 5/2013 |
| JP | 2013-085566 A | 5/2013 |
| JP | 2013-145090 | 7/2013 |
| JP | 2013-145090 A | 7/2013 |
| JP | 2014-147901 | 8/2014 |
| JP | 2014-147901 A | 8/2014 |

OTHER PUBLICATIONS

Office Action dated Jun. 4, 2019 in Japanese Patent Application No. 2015-149665.
International Search Report dated Oct. 11, 2016 in PCT/JP2016/070004 filed Jul. 6, 2016 (with English Translation).
Office Action dated Nov. 5, 2018 in Chinese Patent Application No. 201680043767.X (with English translation of category of cited documents).

* cited by examiner

LIQUID ELECTROMAGNETIC VALVE, METHOD OF MANUFACTURING LIQUID ELECTROMAGNETIC VALVE, AND WASHING MACHINE

CROSS-REFERENCE TO RELATED APPLICATION(S)

This application is a continuation to an International Application No. PCT/JP2016/070004, filed on Jul. 6, 2016 which is based upon and claims the benefit of priority from Japanese Patent Application No. 2015-149665, filed on, Jul. 29, 2015, the entire contents of which are incorporated herein by reference.

TECHNICAL FIELD

Embodiments disclosed herein relate to a liquid electromagnetic valve, a method of manufacturing the liquid electromagnetic valve, and a washing machine.

BACKGROUND ART

Appliances using water such as a washing machine is provided with a liquid electromagnetic valve that openably/closably connects a water source and the interior of the appliance in order to supply water into the interior of the appliance from a water source such as faucet of tap water. A conventional electromagnetic valve used in a washing machine for example merely opens and closes the flow path connecting the water source and the interior of the water tub and thus, water supplied from the faucet of tap water is supplied into the water tub almost as it is with an exception that a detergent, etc. may be dissolved in the water.

In case bubbles are added to the water supplied to the interior of the appliance in order to improve washing effect for example, a bubble generator is generally provided in addition to the liquid electromagnetic valve. However, providing the bubble generator in addition to the liquid electromagnetic valve increases the number of parts and installation space and thereby leads to upsizing of the appliance and increase in cost.

A liquid electromagnetic valve is known in which a device for generating bubbles is provided integrally with the discharge port (See patent document 1 for example) thereof. However, the device is a silencer for reducing the water flowing sound of water passing through the electromagnetic valve and merely generates bubbles and thus, does not provide any additional effects such as improvement of wash effect.

PRIOR ART DOCUMENT

Patent Document

Patent Document 1: Japanese Patent Application Publication No. 2001-347191

SUMMARY OF INVENTION

Problem Solved by Invention

Thus, a liquid electromagnetic valve is provided that discharges liquid supplied from an external liquid source after adding minute bubbles and thereby being capable of providing effects such as improved washing function to the discharged liquid. A method of manufacturing the liquid electromagnetic valve and a washing machine provided with the liquid electromagnetic valve are also provided.

Solution to Problem

A liquid electromagnetic valve according to an embodiment includes an inlet connected to an external liquid source; an outlet discharging a liquid entering from the inlet; a flow path forming member having a flow path connecting the inlet and the outlet formed thereto; an opening-closing member capable of opening and closing the flow path; a drive portion opening and closing the opening-closing member based on a control performed by an external element; and a minute bubble generator provided in the flow path and having plural narrowing portions for adding minute bubbles to a liquid passing through the flow path by narrowing the flow path in plural stages or a minute bubble generator provided in the flow path and adding minute bubbles having a diameter equal to or less than 50 μm to a liquid passing through the flow path.

A method of manufacturing the liquid electromagnetic valve according to an embodiment includes a step of forming the second narrowing portion by etching a metal material, a step of forming the second narrowing portion by cold forging a metal material, or a step of forming the second narrowing portion by molding a carbon graphite material.

A washing machine according to an embodiment is provided with the liquid electromagnetic valve described above.

A washing machine according to an embodiment includes an inlet connected to an external water source; plural outlets discharging water entering from the inlet; and plural liquid electromagnetic valves that switch plural flow paths that connect the inlet with the plural outlets, at least one of the liquid electromagnetic valves being the liquid electromagnetic valve described above.

A washing machine according to an embodiment includes a water supplying device including: an inlet connected to an external water source, an outlet discharging water entering from the inlet into a water tub, and a liquid electromagnetic valve capable of opening and closing a flow path connecting the inlet and the outlet, and a minute bubble generator provided between the inlet and the water source and adding minute bubbles to water entering the inlet by narrowing the flow path in plural stages or a minute bubble generator provided between the inlet and the water source and adding minute bubbles having a diameter equal to or less than 50 μm to water entering the inlet.

BRIEF DESCRIPTION OF THE DRAWINGS

FIG. 8A is a plan view and FIG. 8B is a cross sectional view.

FIG. 9A is a cross sectional view before the cold forging process and FIG. 9B is a cross sectional view after the cold forging process.

EMBODIMENTS OF INVENTION

Embodiments of a liquid electromagnetic valve, a method of manufacturing the liquid electromagnetic valve, and a washing machine are described with reference to the drawings. Elements that are substantially identical across the embodiments are identified with identical reference symbols and are not re-described.

First Embodiment

Figure 1:
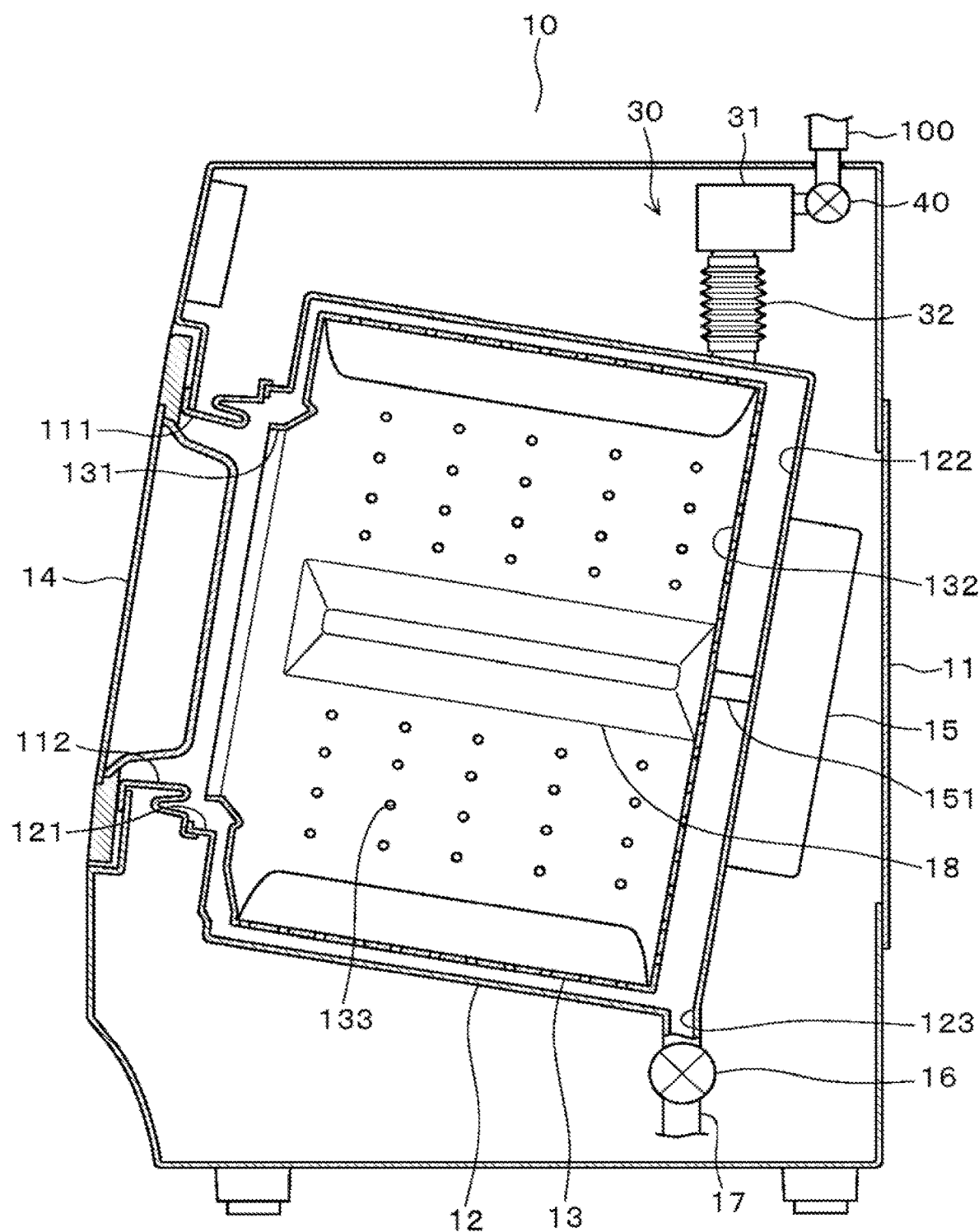
FIG. 1 illustrates one example of a drum-type washing machine according to a first embodiment.

A first embodiment will be described with reference to FIGS. 1 to 4. A washing machine 10 illustrated in FIG. 1 is provided with an outer housing 11, a water tub 12, a rotary tub 13, a door 14, and a motor 15. It is assumed that the left side of FIG. 1 is the front side of the washing machine 10 and the right side of FIG. 1 is the rear side of the washing machine 10. It is further assumed that the installation surface side, that is, the vertically lower side of the washing machine 10 is the lower side of the washing machine 10 and the side opposite the installation surface, that is, the vertically upper side is the upper side of the washing machine 10.

The washing machine 10 is the so-called lateral axis drum-type washing machine in which the rotary axis of the rotary tub 13 is horizontal or rearwardly declined. The outer housing 11 constitutes the enclosure the washing machine 10. The outer housing 11 formed of a steel plate for example is formed into a substantially rectangular box having a front opening 111. The water tub 12 is stored inside the outer housing 11. The rotary tub 13 is stored inside the water tub 12. The water tub 12 is formed into a bottomed cylinder having an opening 121 in the front side and a water-tub bottom 122 in the rear side. Similarly, the rotary tub 13 is formed into a bottomed cylinder having an opening 131 in the front side and a rotary-tub bottom 132 in the rear side.

The water tub 12 is provided with a drain port 123 near the water-tub bottom 122 in the lower side. The washing machine 10 is further provided with a drain valve 16 and a drain hose 17. The drain valve 16 is an electronically controlled electromagnetic valve for example and is drive controlled by a controller not shown. Opening of the drain valve 16 causes water inside the water tub 12 to be drained outside the washing machine 10 from the drain port 123 via the drain valve 16 and the drain hose 17.

The rotary tub 13 is provided with plural holes 133. The holes 133 communicate the interior of the rotary tub 13 with the exterior of the rotary tub 13. The holes 133 are formed throughout the peripheral wall constituting the tubular portion of the cylindrical rotary tub 13. The water supplied into the water tub 12 flows in and out of the rotary tub 13 through the holes 133. The rotary tub 13 is provided with plural baffles 18 located in the inner side of the tubular portion. The baffles 18 rotate with the rotary tub 13 to agitate the laundry stored inside the rotary tub 13.

A door 14 is provided on the outer surface side of the outer housing 11 via a hinge not shown. The door 14 rotates with the hinge serving as a fulcrum to open and close the opening 111 formed on the front surface of the outer housing 11. The opening 111 formed on the outer housing 11 is connected to the opening 121 of the water tub 12 through bellows 112. Laundry such as clothes is taken in and out of the rotary tub 13 through each of the openings 111, 121, and 131 with the door 14 opened.

A motor 15 is provided on the water-tub bottom 122 in the outer side of the water tub 12. The motor 15 comprises a brushless DC motor of an outer rotor type for example. A rotary shaft 151 of the motor 15 extends through the water-tub bottom 122 to project to the inner side of the water tub 12 and is secured to the central portion of the rotary-tub bottom 132. Thus, the motor 15 rotates the rotary tub 13 relatively with respect to the water tub 12. The rotary shaft 151, the rotary shaft of the rotary tub 13, and the central axis of the water tub 12 are coincident.

Figure 2:
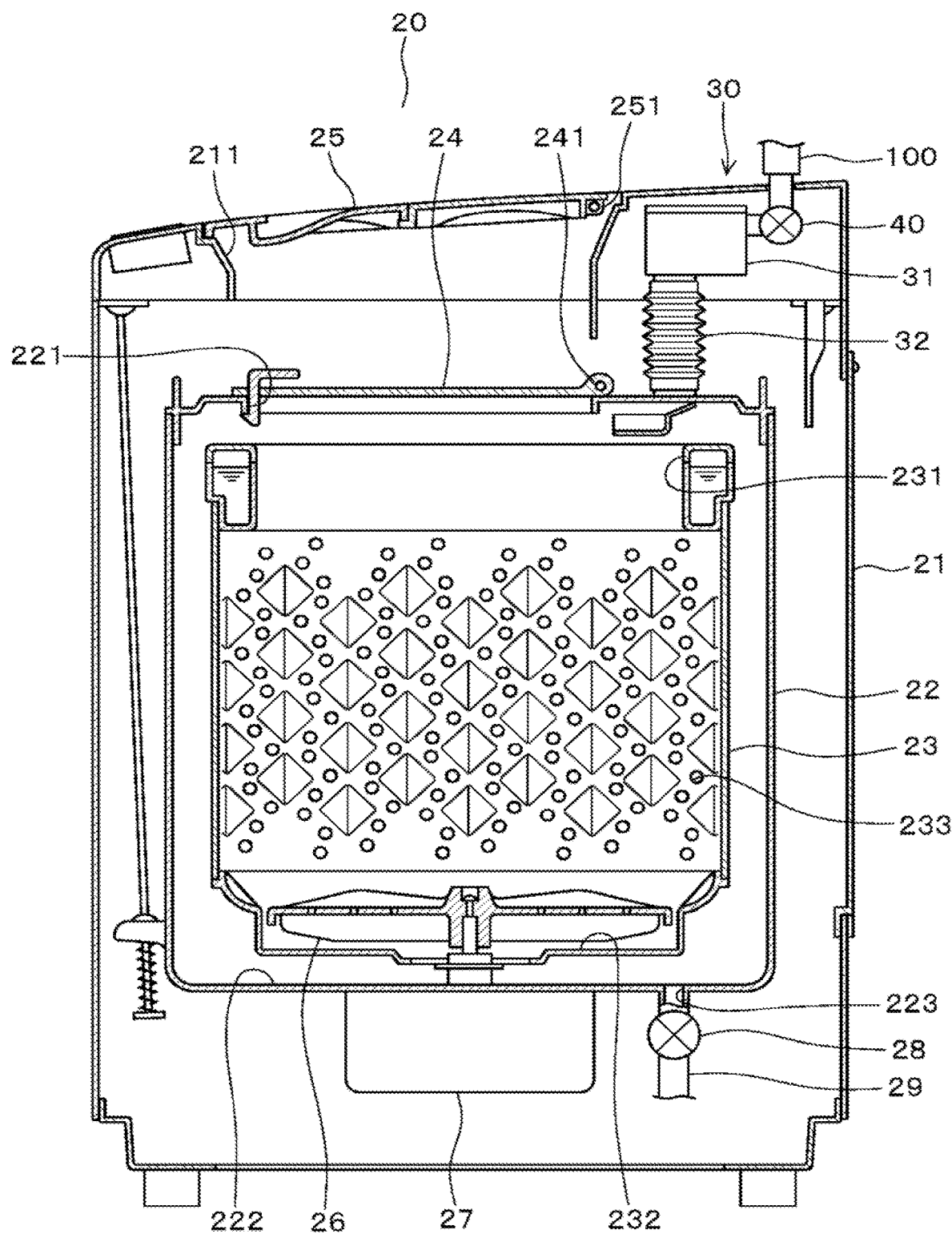
FIG. 2 illustrates one example of a vertical washing machine according to the first embodiment.

A washing machine 20 illustrated in FIG. 2 provided with an outer housing 21, a water tub 22, a rotary tub 23, an inner lid 24, an outer lid 25, baffles 26, and a motor 27. It is assumed that the left side of FIG. 2 is the front side of the washing machine 20 and the right side of FIG. 2 is the rear side of the washing machine 20. It is further assumed that the installation surface side, that is, the vertical lower side of the washing machine 20 is the lower side of the washing machine 20 and the side opposite the installation surface, that is, the vertical upper side is the upper side of the washing machine 20.

The washing machine 20 is the so-called vertical washing machine in which the rotary shaft of the rotary tub 23 is oriented in the vertical direction. The outer housing 21 constitutes the enclosure of the washing machine 20. The outer housing 21 formed of a steel plate for example is formed into a substantially rectangular box having an upper opening 211. The water tub 22 is stored inside the outer housing 21. The rotary tub 23 is stored inside the water tub 22. The water tub 22 is formed into a bottomed cylinder having an opening 221 in the upper side and a water-tub bottom 222 in the lower side. Similarly, the rotary tub 23 is formed into a bottomed cylinder having an opening 231 in the upper side and a rotary-tub bottom 232 in the lower side.

The water tub 22 has a drain port 223 provided at the water-tub bottom 222. Further, the washing machine 20 is provided with a drain valve 28 and a drain hose 29. The drain valve 28 is an electronically controlled electromagnetic valve for example and is drive controlled by a controller not shown. Opening of the drain valve 28 causes water inside the water tub 22 to be drained outside the washing machine 20 from the drain port 223 via drain valve 28 and drain hose 29.

The rotary tub 23 is provided with plural holes 233. The holes 233 communicate the interior of the rotary tub 23 with the exterior of the rotary tub 23. The holes 233 are formed throughout the peripheral wall constituting the tubular portion of the cylindrical rotary tub 23. The water supplied into the water tub 22 flows in and out of the rotary tub 23 through the holes 233.

The inner lid 24 is provided on the upper surface of the water tub 22 via hinge 241. The inner lid 24 rotates with the hinge 241 serving as a fulcrum to open and close an opening 221 formed in the upper portion of the water tub 22. The outer lid 25 is provided on the upper surface of the outer housing 21 via a hinge 251. The outer lid 25 rotates with the hinge 251 serving as a fulcrum to open and close an opening 211 formed in the upper portion of the outer housing 21. The outer lid 25 is a folding lid which can be folded in a mountain fold at the central portion of the lid 25 as viewed in the front and rear direction. Laundry such as clothes are taken in and out of the rotary tub 23 through each of the openings 211, 221, and 231 with the inner lid 24 and the outer lid 25 opened.

The baffles 26 are provided near the rotary-tub bottom 232 inside the rotary tub 23. The baffles 26 are relatively rotatable with respect to the rotary tub 23. The motor 27 is provided on the water-tub bottom 222 in the outer side of the water tub 22. The motor 27 comprises a brushless DC motor of an outer rotor type for example. The motor 27, the rotary tub 23, and the baffles 26 are connected by a clutch not shown. The clutch not shown is capable of selectively switching between a state in which only the baffles 26 are rotated and a state in which the baffles 26 and the rotary tub 23 are rotated integrally. The baffles 26 agitate the laundry stored inside the rotary tub 23 by rotating relatively with respect to the rotary tub 23.

Further, as shown in FIGS. 1 and 2, the washing machines 10, 20 are each provided with a water supplying device 30. The water supplying devices 30 are each provided in the upper rear portion of the interior of the outer housings 11, 21. The water supplying device 30 is provided with a water supplying case 31, water supplying hose 32, and at least one liquid electromagnetic valve 40. The water supplying device 30 is connected to an external water source such as faucet of tap water not shown for example via a water feeding hose 100. The water supplying hose 32 connects the water supplying case 31 with the interiors of the water tubs 12, 22.

The liquid electromagnetic valve 40 is provided between the water feeding hose 100 and the water supplying case 31. The liquid electromagnetic valve 40 opens and closes the flow path between the water feeding hose 100 and the water supplying case 31 and the opening and closing of the liquid electromagnetic valve 40 is controlled by the control signals given by the controllers not shown of the washing machines 10, 20. When the liquid electromagnetic valve 40 is opened, water from the external water source is supplied into the water tubs 12, 22 via the liquid electromagnetic valve 40, the water supplying case 31, and the wat supplying hose 32. When the liquid electromagnetic valve 40 is closed, supply of water into the water tubs 12, 22 is stopped.

Figure 3:
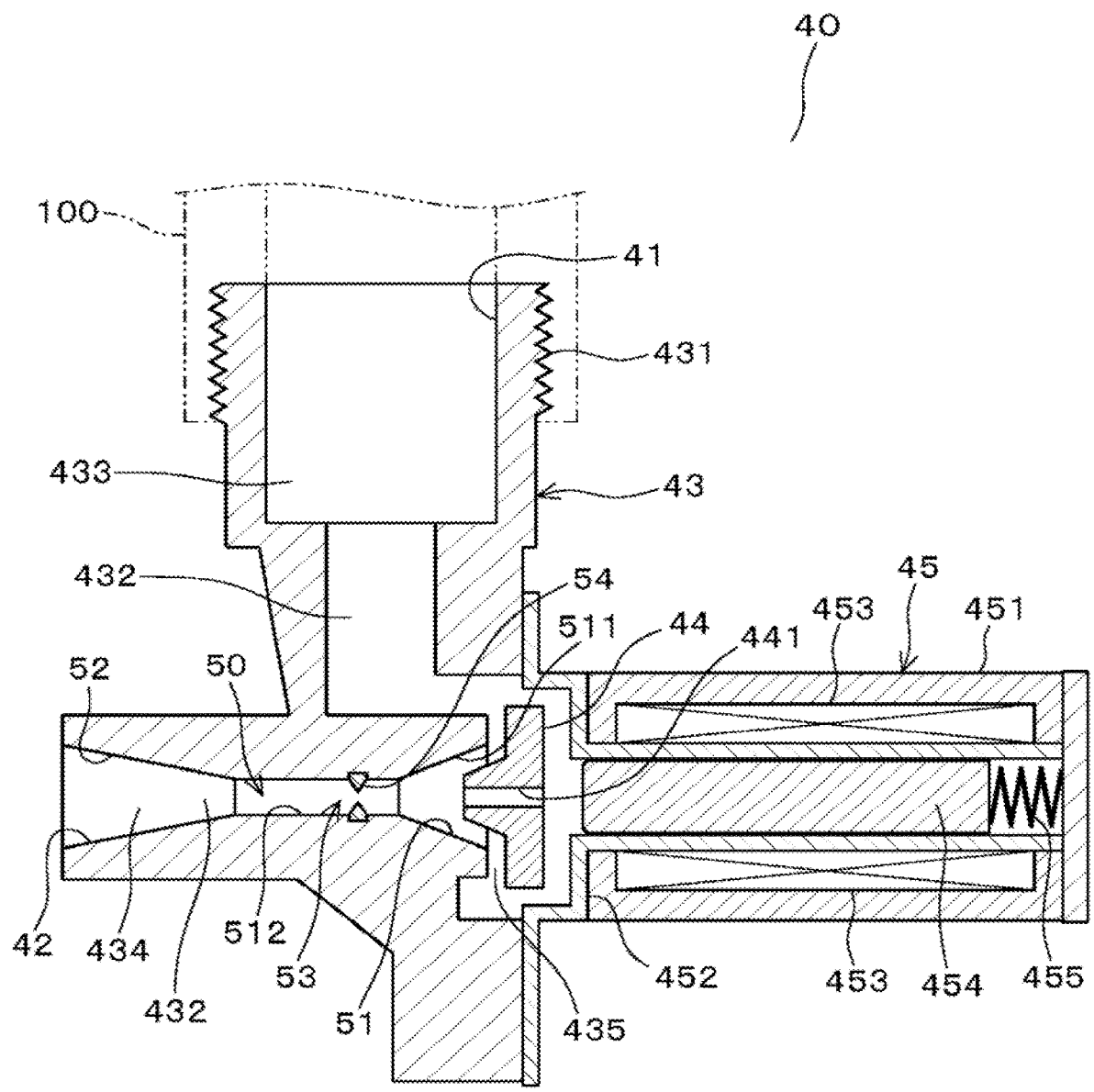
FIG. 3 illustrates one example of a liquid electromagnetic valve according to the first embodiment.

Next, the configuration of the liquid electromagnetic valve 40 (hereinafter simply referred to as electromagnetic valve 40) will be described with reference to FIGS. 3 and 4. The electromagnetic valve 40 is the so-called diaphragm type valve and is operated in response to control signals given by the controllers not shown of the washing machines 10, 20. As shown in FIG. 3, the electromagnetic valve 40 is provided with an inlet 41, an outlet 42, a flow path forming member 43, an opening-closing member 44, a drive portion 45, and a minute bubble generator 50.

The inlet 41 serves as an entrance port of the electromagnetic valve 40 and is connected to external water source such as faucet of tap water via water feeding hose 100. The outlet 42 serves as an exit port of the electromagnetic valve 40 and is connected to the water supplying case 31. In the present embodiment, the inlet 41 and the outlet 42 are formed in the flow path forming member 43.

The flow path forming member 43 is formed for example of a metal material, a resin, or the like. The flow path forming member 43 is provided with a mounting thread 431. The mounting thread 431 is a male thread formed on the outer peripheral side of the flow path forming member 43 corresponding to a portion where the inlet 41 is provided. The mounting thread 431 is capable of being threaded with a female thread formed on the inner side of the end of the water feeding hose 100. The mounting thread 431 is a standardized component which is commonly used by each washing machine manufacturer for example. Thus, the water feeding hose 100 made by each manufacturer can be mounted on the mounting thread 431.

Inside the flow path forming member 43, a flow path 432 is formed that connects the inlet 41 and the outlet 42. The water entering the electromagnetic valve 40 from the inlet 41 passes through the flow path 432 and flows outside the electromagnetic valve 40 from the outlet 42. The opening-closing member 44 is the so-called diaphragm valve and is provided midway of the flow path 432 so as to be capable of opening and closing the flow path 432.

The opening-closing member 44 divides the flow path 432 into a flow-in portion 433 in the upstream side and a flow-out portion 434 in the downstream side. When the opening-closing member 44 closes the flow path 432, the flow-in portion 433 and the flow-out portion 434 become separated. As a result, the water entering from the inlet 41 does not flow out from the outlet 42. When the opening-closing member 44 opens the flow path 432 on the other hand, the flow-in portion 433 communicates with the flow-cut portion 434. As a result, water entering from the inlet 41 flows out from the outlet 42. The opening-closing member 44 is shaped like a circular disc and is formed of a thin elastically deformable metal plate or a rubber plate for example. The opening-closing member 44 is provided with a communicating hole 441 at the central portion of its circular disc shaped body. The communicating hole 441 extends thickness wise in a circular shape through the central portion of the opening-closing member 44. The opening and closing movement of the opening-closing member 44 is performed by the driving of the drive portion 45.

The drive portion 45 comprises a solenoid and is driven based on external control signals which are, in this case, control signals given by the controllers of the washing machines 10, 20. The drive portion 45 is provided with a frame 451, a bobbin 452, a coil 453, a plunger 454, and a coil spring 455. The frame 451 is formed in a cylindrical shape by a magnetic metal material for example. The bobbin 452, the coil 453, the plunger 454, and the coil spring 455 are stored inside the frame 451. The bobbin 452 is formed into a cylindrical shape as a whole by a nonmagnetic resin for example. The coil 453 is formed by winding a conductive wire around the bobbin 452.

The plunger 454 is a cylindrical bar formed of a magnetic metal material. The plunger 454 is stored slidably inside the bobbin 452. The coil spring 455 comprises a compression coil spring and is provided so as to press one end of the plunger 454.

When the coil 453 is not energized, the plunger 454 receives elastic force from the coil spring 455 and moves in the direction to project from the bobbin 452. That is, in this case, the plunger 454 moves leftward as viewed in FIG. 3. As a result, the plunger 454 presses the opening-closing member 44 and blocks the communicating hole 441. Thus, water in the flow-in portion 433 side is not allowed to move to the flow-out portion 434 side through the communicating hole 441, thereby causing the water pressure in the flow-in portions 433 side to become greater than in the flow-cut portion 434 side. As a result, the opening/closing member 44 is pressed against the start point portion of the flow-out portion 434 by the water pressure of the flow-in portion 433 side. This causes the mid portion of the flow path 432 to be closed to place the electromagnetic valve 40 in a closed state.

When the coil 453 is energized on the other hand, the plunger 454 receives magnetic force greater than the elastic force of the coil spring 455 from the coil 453. As a result, the plunger 454 moves in the direction to be drawn into the bobbin 452. That is, in this case, the plunger 454 moves rightward as viewed in FIG. 3. Then, the blockage of the communicating hole 441 of the opening-closing member 44 is released and the flow-in portion 433 side and the flow-out portion 434 side communicate through the communicating hole 441. Thus, water in the flow-in portion 433 side allowed to move to the flow-out portion 434 side to cause the water pressure in the flow-in portion 433 side to be equal to the water pressure in the flow-out portion 434 side. As a result, the opening-closing member 44 floats away from the start point portion of the flow-out portion 434 by the water pressure of the flow-in portion 433 side and a space 435 is created between the inner wall of the flow path forming member 43 and the opening losing member 44. Thus, water in the flow-in portion 433 side flows to the flow-out portion 434 side through the space 435. This causes the mid portion of the flow path 432 to be opened to place the electromagnetic valve 40 in an opened state.

The minute bubble generator 50 is provided midway of the flow path 432 inside the flow path forming member 43 and more specifically in the downstream side of the opening-closing member 44 that is, in the flow-out portion 434. The minute bubble generator 50 forms minute bubbles having a diameter equal to or less than 50 μm in the liquid, which is water in this case, passing through the flow path 432. In the present embodiment, the minute bubble generator 50 a cavitation type which forms minute bubbles by rapidly lowering the pressure of liquid flowing through the flow path 432. The principle for generating minute bubbles by the minute bubble generator 50 is not limited to the cavitation method.

The minute bubble generator 50 employs a structure in which the flow path 432 passing therethrough is narrowed in plural stages. The minute bubble generator 50 is configured by a first narrowing portion 51 which is the first stage narrowing portion, a widening portion 52, and a second narrowing portion 53 which is the second stage narrowing portion narrower than the first stage narrowing portion to thereby provide plural stages, which are two stages in this case, of narrowing portions. In the present embodiment, the first narrowing portion 51, the widening portion 52, and the second narrowing portion 53 are formed so as to be integral with the flow path forming member 43. The first narrowing portion 51 continuously reduces the cross sectional area of the flow path 432 toward the downstream side of the flow path 432 from the upstream side of the flow path 432.

That is, the first narrowing portion 51 is provided with a constricting portion 511 and a minimum diameter portion 512. The constricting portion 511 is conically tapered so that the cross sectional area thereof becomes continuously smaller towards the downstream side from the upstream side. The minimum diameter portion 512 is provided in the downstream end side of the constricting portion 511 and is formed to have a cross sectional area equal to the cross sectional area of the smallest portion of the constricting portion 511 that is, the downstream end portion of the constricting portion 511. The minimum diameter portion 512 is formed in a predetermined length.

The widening portion 52 provided in the downstream end side of the first narrowing portion 51, that is, in the downstream end side of the minimum diameter portion 512 and continuously increases the cross sectional area of the flow path 432 toward the downstream side of the flow path 432 from the upstream side of the flow path 432. In other words, the widening portion 52 is conically tapered so that the cross sectional area thereof becomes continuously larger towards the downstream side from the upstream side. The first narrowing portion 51 and the widening portion 52 form a Venturi tube. The length of the widening portion 52 is greater than the length of the constricting portion 511 as viewed in the water flow direction. Further, the cross sectional area at the start point portion of the constricting portion 511 that is, the inlet portion of the minute bubble generator 50 is substantially equal to the cross sectional area of the end point portion of the widening portion 52, that is, the outlet portion of the minute bubble generator 50.

The second narrowing portion 53 is provided at a portion of the first narrowing portion 51 having the smallest cross sectional area, that is, at the minimum diameter portion 512. As shown in FIG. 4, the second narrowing portion 53 is provided with plural projections 54 and plural regions 521 defined by the projections 54. The projections 54 are each configured by a bar extending to the central portion of the flow path 432 from the peripheral wall of the minimum diameter portion 512 and a tip of the bar. The plural projections 54 divide the flow path 432 into plural regions 521 with a central gap 522 and slits 523 provided at the central portion of the flow path 432. As a result, the second narrowing portion 53 locally reduces the cross sectional area of the flow path 432 to be less than the cross sectional area of the minimum diameter portion 512. The cross sectional areas of each of the regions 521 are equal. The number of the divided regions 521 is preferably three or more. That is, it is preferable to have three or more projections 54. In the second narrowing portion 53 of the present embodiment, the flow path 432 is divided into four regions 521 by four projections 54.

Figure 4:
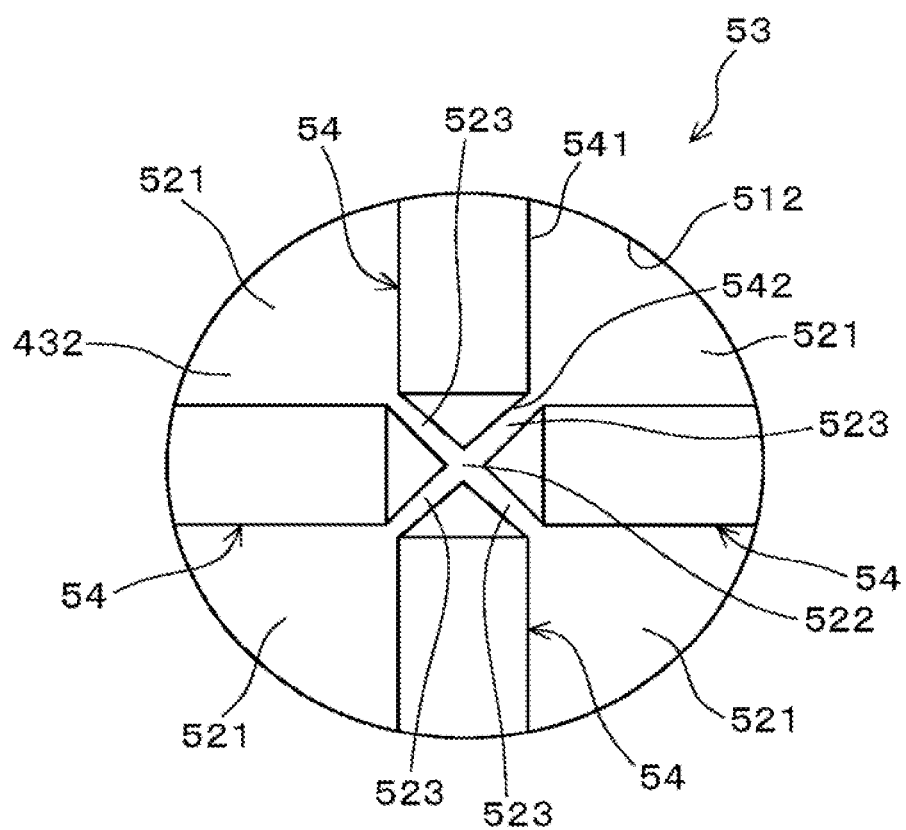
FIG. 4 illustrates one example of a second narrowing portion according to the first embodiment.

As shown in FIG. 4, the projection 54 is configured by a cylindrical shaft 541 and a conical portion 542 shaped like a circular cone formed at the tip of the shaft 541. The projections 54 are disposed so that the conical portions 542 are face to face with one another with spacing therebetween. The central gap 522 is formed between the tips of the four conical portions 542. Each of the four slits 523 is formed between the two adjacent conical portions 542. The four slits 523 communicate with one another through the central gap 522. The central gap 522 and the four slits 523 form a cruciform shape as a whole.

When the coil 453 is energized and the drive portion 45 is operated, the opening-closing portion 44 opens the flow path 432. As a result, tap water supplied from the faucet of tap water for example and flowing into the electromagnetic valve 40 from the inlet 41 flows in the minute bubble generator 50. The tap water is a gas dissolving liquid primarily dissolving air as gas. The minute bubble generator 50 generates minute bubbles having a diameter equal to or less than 50 μm in the water passing through the minute bubble generator 50. The principle of minute bubble generation by the minute bubble generator 50 is considered to be as follows.

The water passing through the minute bubble generator 50 is throttled when it passes through the constricting portion 511 of the first narrowing portion 51 and gradually increases its flow velocity. When the high velocity water is discharged to the widening portion 52 after passing through the minimum diameter portion 512, pressure is rapidly reduced by the increase in the cross sectional area of the flow path 432. Bubbles are generated in the water by the cavitation effect caused by the rapid reduction of pressure.

Further, when the water flowing through the minimum diameter portion 512 collides with the projections 54, the water primarily flows along the periphery of the cylindrical shafts 541 and becomes divided into the plural regions 521. Thus, the water flowing in the flow path 432 is further throttled when passing through the second narrowing portion 53. Hence, the flow velocity of water passing through the second narrowing portion 53 is further accelerated to further increase the cavitation effect. As a result, the bubbles generated in the water passing through the second narrowing portion 53 are refined to a diameter of 50 µm or less and the amount of the minute bubbles are increased. As described above, it is possible to generate large amount of minute bubbles by passing water through the minute bubble generator 50.

The plural projections 54 form the central gap 522 and the slits 523 at the central portion of the flow path 432. The areas of the central gap 522 and the slits 523 are smaller than the area of each of the regions 521. The conical portion 542 shaped like a circular cone is formed at the tip of the projection 54. The tip of each projection 54 is tapered toward the central portion of the flow path 432, that is, toward the central gap 522. Thus, the conical portion 542 is unlikely to become a resistance to the water flowing through the central gap 522 and the slits 523.

The water colliding with the vicinity of the conical portion 542 of the projection 54 flows along the periphery of the conical portion 542 to pass through the slit 523 and is also guided toward the tip of the conical portion 542 to pass through the central gap 522. Among the water passing through the second narrowing portion 53, the water passing through the central gap 522 and the slits 523 are further accelerated compared to the water passing through the peripheral regions 521. It is thus, possible to further increase the cavitation effect and thereby further miniaturize the bubbles generated in the water and increase the amount of minute bubbles.

Minute bubbles are generally categorized as follows depending upon the diameters of the bubbles. For example, a minute bubble having a diameter ranging from several micrometers to 50 micrometers is referred to as a micro bubble or a fine bubble. A minute bubble having a diameter equal to or less than several tens of nanometers is referred to as a nano bubble or an ultrafine bubble. A minute bubble having a diameter ranging between a micro bubble and a nano bubble is referred to as a micro-nano bubble. Bubbles having a diameter of several tens of nanometers are smaller than the wavelength of light and thus, are not visible to the eye. Thus, a liquid containing such bubbles appear transparent. The above described minute bubbles are known to provide outstanding wash performance in washing object contained in the liquid because of characteristics such as a large total interface area, slow floating speed, and high inner pressure.

For example, a bubble having a diameter of 100 µm or more rapidly rises in the liquid by its buoyancy and disappear after bursting at the liquid surface and thus, exists in the liquid for a relatively short period of time. A minute bubble having a diameter less than 50 µm on the other hand, exists in the liquid for a long time because its buoyancy is small. For example, a micro bubble contracts and ultimately collapses in the liquid to form a further smaller nano bubble. When the micro bubble collapses, high temperature heat and high pressure are locally generated and the heat and the pressure destroy foreign materials such as organic materials that are floating in the liquid or attached to objects in the liquid. High washing performance is exerted in the above described manner.

Further, micro bubbles are negatively charged and thus, tend to adsorb positively charged foreign materials floating in the liquid. Thus, foreign materials destroyed by the collapsing of the micro bubbles are adsorbed by the micro bubbles and slowly float to the liquid surface. The liquid is cleaned by removing the foreign materials gathered at the liquid surface. High washing performance is exerted in the above described manner.

According to the liquid electromagnetic valve 40 of the present embodiment, it is possible to add minute bubbles to a liquid, which is tap water in this case, supplied from an external liquid source such as faucet of tap water. It is thus, possible to add purifying and washing functions, etc. to tap water discharged from the liquid electromagnetic valve 40. That is, the liquid electromagnetic valve 40 has the minute bubble generator 50 built in to it. Thus, by providing the liquid electromagnetic valve 40 of the present embodiment as an electromagnetic valve indispensable to an appliance using liquid such as water, it is possible to easily add washing function etc. to the liquid used by the appliance without providing a minute bubble generator separate from the liquid electromagnetic valve 40. As a result, it is possible to inhibit increase in the number of parts and installation area resulting from the provision of a separate minute bubble generator and consequently inhibit upsizing of the appliance as a whole and increase in cost.

In the present embodiment, the washing machines 10, 20 are provided with the liquid electromagnetic valve 40 having the minute bubble generator 50 built in to it. Thus, it is possible to readily add minute bubbles such as micro bubbles and nano bubbles to the tap water supplied into the water tubs 12, 22 and thereby add functions such as improvement of purification and washing functions by the minute bubbles. It is thus, possible to improve the wash performance and rinse performance of the washing machines 10, 20 and consequently reduce the amount of detergent, etc. used in the wash and amount of rinse water used. As a result, it is possible to reduce the amount of drainage discharged from the washing machines 10, 20 and the amount of detergent contained in the drainage to consequently reduce environmental burden.

The minute bubble generator 50 is configured to add minute bubbles in the liquid passing through the internal flow path 432 by narrowing the flow path 432 in plural stages. As a result, it is possible to relatively simplify the structure of the minute bubble generator 50. It is thus, possible to add minute bubbles such as micro bubbles and nano bubbles to the liquid discharged from the minute bubble generator 50 more easily.

The liquid electromagnetic valve 40 is capable of discharging water containing minute bubbles having a diameter equal to or less than 50 µm by the minute bubble generator 50 built in to it. Minute bubbles having a diameter equal to or less than 50 µm are referred to as fine bubbles or ultrafine bubbles and are known to exert excellent washing performance on objects contained in the liquid. It is thus, possible to further improve the wash performance and the rinse performance of the washing machines 10, 20 and reduce the amount of detergent used in the wash and the amount of rinse water used even more effectively.

The minute bubble generator 50 is provided with plural stages, in this case, two stages of narrowing portions, namely the first narrowing portion 51 and the second narrowing portion 53. It is thus, possible to further accelerate the water accelerated by the first narrowing portion 51 by the second narrowing portion 53 and further improve the cavitation effect. As a result, it is possible to further miniaturize the bubbles generated in the water and increase the amount of minute bubbles.

At least the first narrowing portion 51 and the widening portion 52 of the minute bubble generator 50 are formed integrally with the flow path forming member 43 of the electromagnetic valve 40. It is thus, possible to reduce the size of the electromagnetic valve 40 having the minute bubble generator 50 built in to it. Further, according to such electromagnetic valve 40, it is possible to inhibit the increase in the number of parts originating from the minute bubble generator 50 being built in to the electromagnetic valve 40. By providing the minute bubble generator 50 integrally with the electromagnetic valve 40, it is possible to eliminate piping which would be required when a separate minute bubble generator is provided and thereby prevent water leakage which is prone to occur from the joints of such piping as much as possible.

Especially in the minute bubble generator 50 of the present embodiment, it is considered that the cavitation effect is increased as the velocity of water passing through the plural stages of narrowing portions, which are the first narrowing portion 51 and the second narrowing portion 53 in this case, is increased and that the resulting minute bubbles are increased in amount and miniaturized. Thus, in order to generate minute bubbles more effectively using the minute bubble generator 50, high water pressure of a certain level needs to be applied to the minute bubble generator 50. It is thus, extremely effective to provide the minute bubble generator 50 integrally with the liquid electromagnetic valve 40 in order to prevent water leakage originating from the water pressure applied to the minute bubble generator 50.

The minute bubble generator 50 is provided in the downstream side of the opening-closing member 44 in the electromagnetic valve 40. Accordingly, it is possible to reduce the distance from the minute bubble generator 50 to the outlet 42 as much as possible. It is thus, possible to discharge the minute bubbles generated by the minute bubble generator 50 from the outlet 42 efficiently at higher density. Further, by reducing the distance from the minute bubble generator 50 to the outlet 42 as much as possible, it is possible to prevent structures in the flow path 432 such as the opening-closing member 44 from being damaged by the shockwaves generated by the collapsing of the minute bubbles.

The water supplying device 30 of the washing machines 10, 20 is provided with the electromagnetic valve 40 having the minute bubble generator 50 built in to it. It is thus, possible to improve the wash performance and the rinse performance of the washing machines 10, 20 by the water containing minute bubbles generated when passing through the minute bubble generator 50. That is, by performing a washing operation with water containing minute bubbles, it is possible to improve permeation of detergent into the clothes and efficiently remove contamination in the back of the fibers. Washing performance is thus, improved. Further, by rinsing the clothes with water containing minute bubbles, it is possible to remove detergent attached to the fibers and thereby improve the rinse performance.

Further according to the present embodiment, the minute bubble generator 50 is capable of generating minute bubbles by the water pressure given by the faucet without using electricity, etc. It is thus, possible to improve energy saving performance compared to a minute bubble generator that consumes electric power for example.

Second Embodiment

Figure 5:
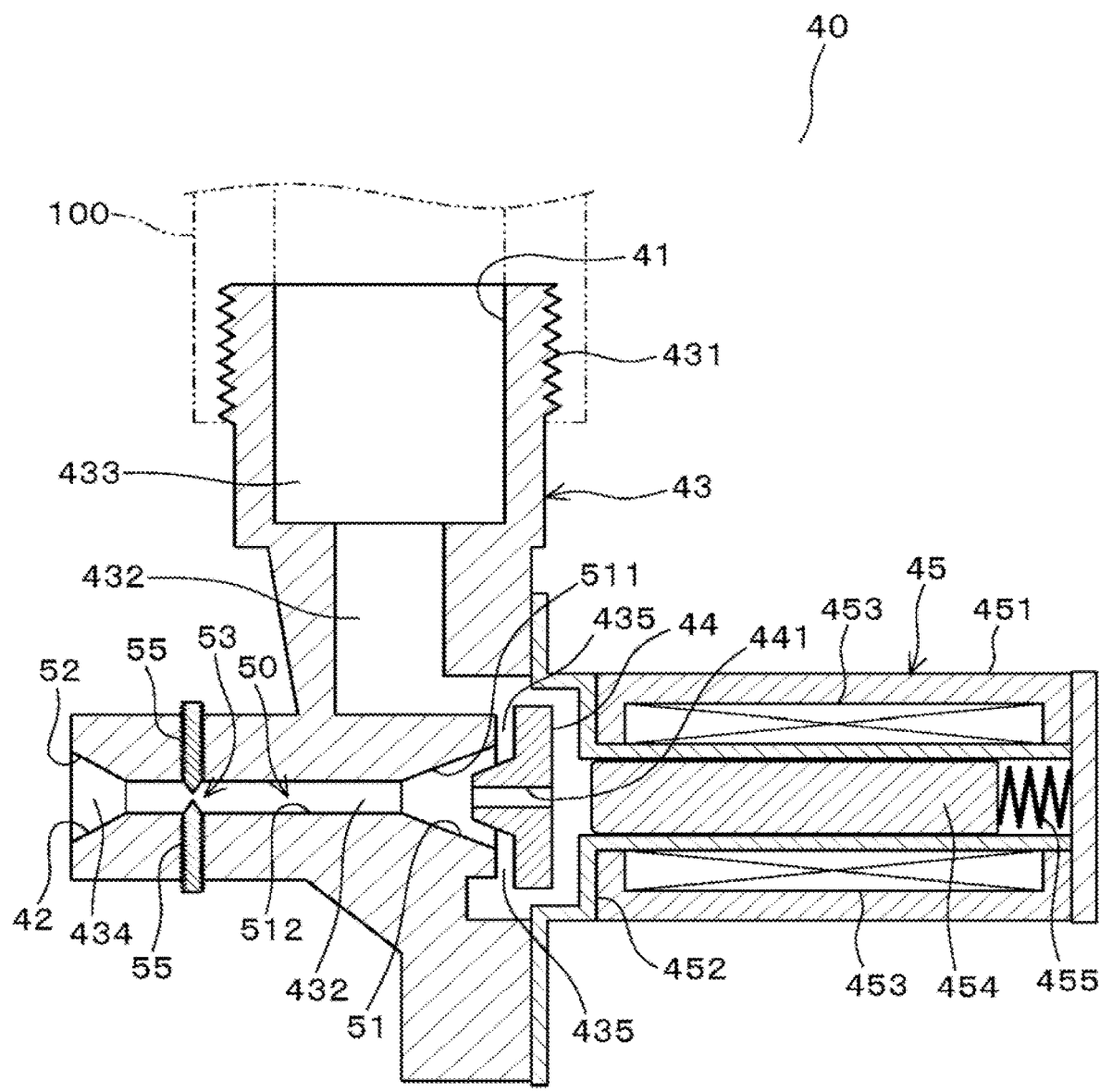
FIG. 5 illustrates one example of the liquid electromagnetic valve according to a second embodiment.

Next, a second embodiment will be described with reference to FIG. 5.

In the electromagnetic valve 40 of the second embodiment, the second narrowing portion 53 is provided with a projection 55 instead of the projection 54. The projection 55 is a male thread having a conical tip as was the case in the projection 54. That is, the tip of the projection 55 is formed in a conical shape and the projection 55 is inserted into the flow path 432. A male thread is formed on the outer peripheral portion of the projection 55. A hexagonal hole for example for use with a tool is formed on the base end of the projection 55 exposed to the outside. The second narrowing portion 53 is configured by threading plural projections 55, four in this case, into the flow path forming member 43 from the outer side of the flow path forming member 43.

According to the above described configuration, the electromagnetic valve 40 is capable of discharging liquid containing minute bubbles as was the case in the first embodiment. Further according to the present embodiment, the projection 55 can be mounted from the outer side of the flow path forming member 43. It is thus, possible to facilitate the attachment of the projection 55 to the flow path forming member 43 and improve work efficiency. Relatively precise adjustment is required for the central gap 522 and the slits 523 of the second narrowing portion 53. In the present embodiment, it is possible to make adjustments in the central gap 522 and slits 523 relatively easily through adjustment in the amount in which the projections 55 are threaded from the outer side of the flow path forming member 43. As a result, it is possible to improve the productivity of the electromagnetic valve 40 and also improve work efficiency.

Third Embodiment

Next, a third embodiment will be described with reference to FIGS. 6 to 10.

Figure 6:
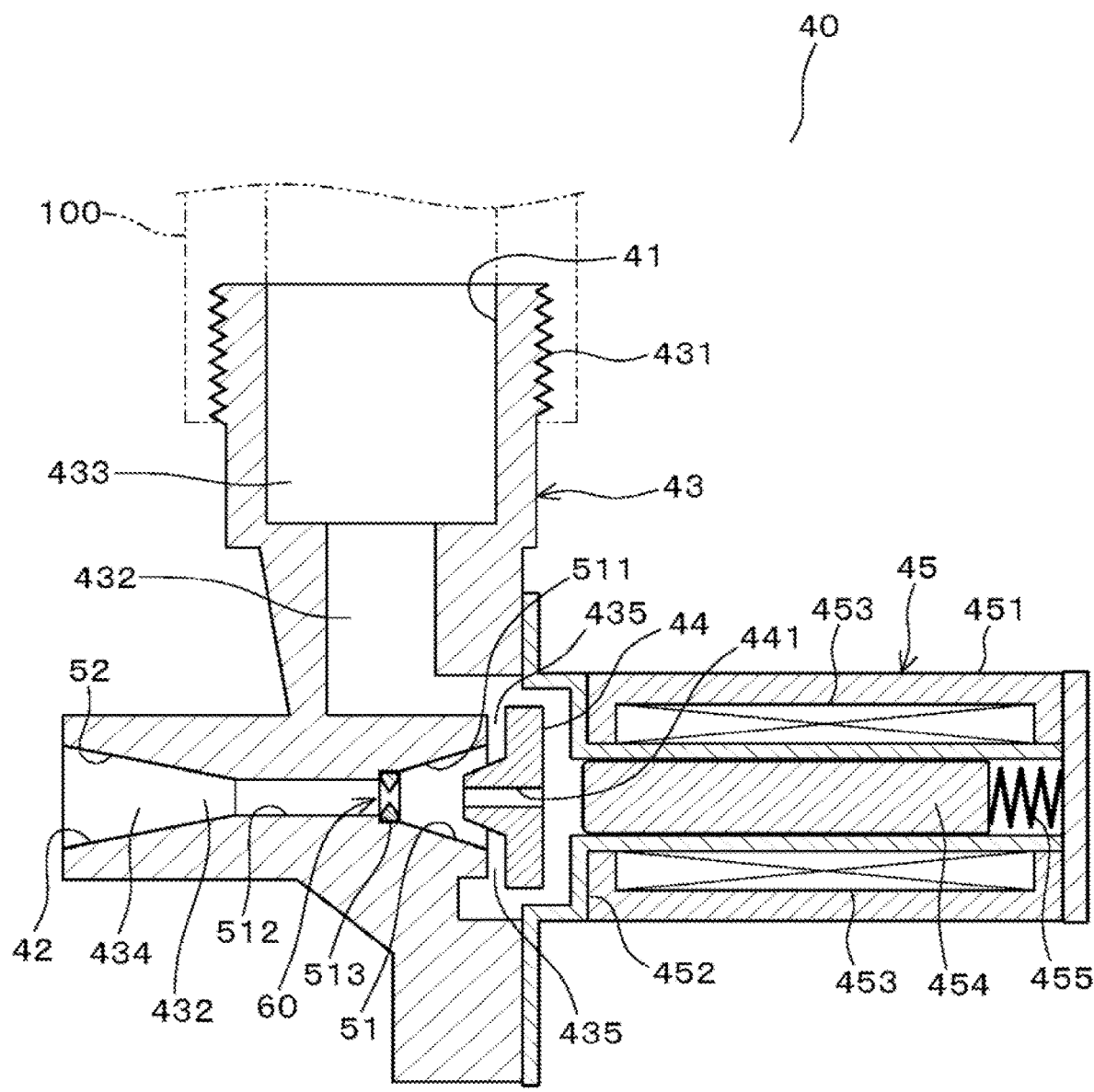
FIG. 6 illustrates one example of the liquid electromagnetic valve according to a third embodiment.

The electromagnetic valve 40 of the third embodiment is provided with a second narrowing portion 60 instead of the second narrowing portion 53 of the first embodiment as illustrated in FIG. 6. The second narrowing portion 60 is configured separately from the flow path forming member 43, that is, configured as a separate component from the flow path forming member 43. The second narrowing portion 60 is inserted into the constricting portion 511 from the inlet side of the constricting portion 511 of the first narrowing portion 51 and is provided at the boundary between the constricting portion 511 and the minimum diameter portion 512.

A stepped portion 513 for locking the second narrowing portion 60 is formed at the boundary between the constricting portion 511 and the minimum diameter portion 512. The second narrowing portion 60 is subjected to high pressure as the flow velocity is accelerated by the constricting portion 511. However, the movement of the second narrowing portion 60 is restricted since the second narrowing portion 60 is locked by the stepped portion 513. It is thus, possible to prevent the second narrowing portion 60 from moving from the predetermined installation site.

Figure 7:
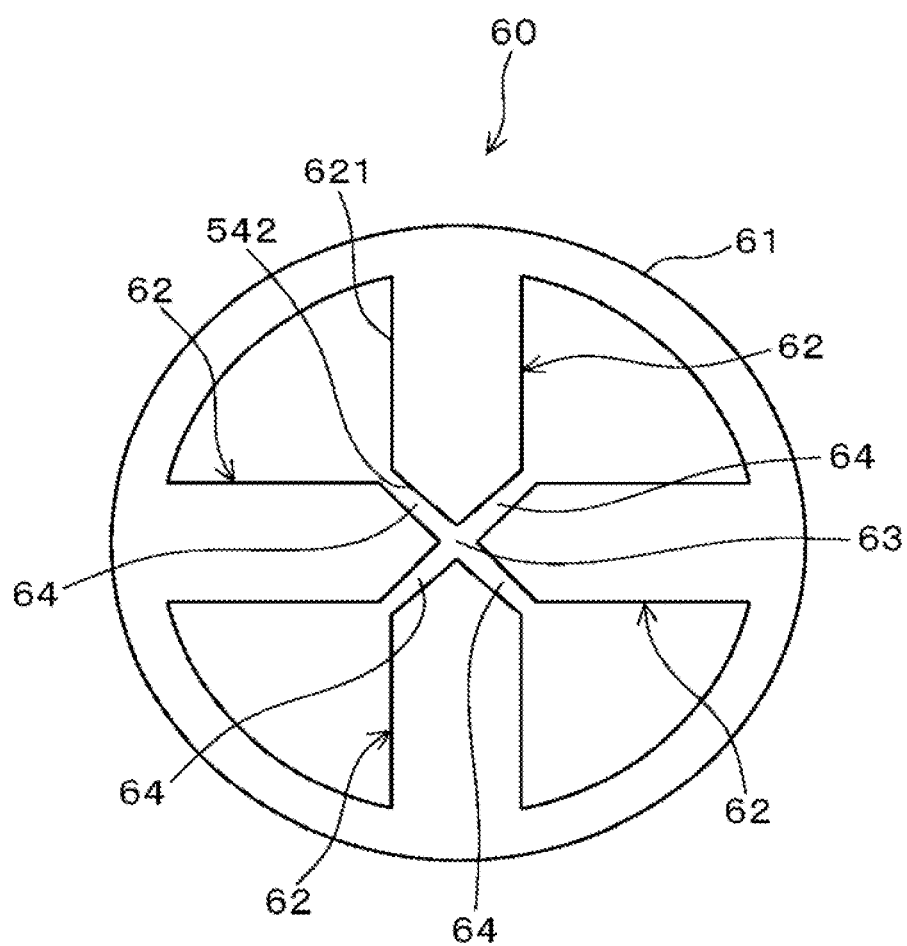
FIG. 7 illustrates one example of the second narrowing portion according to the third embodiment.

As shown in FIG. 7, the second narrowing portion 60 is integrally provided with an annular portion 61 and plural, for example, four projections 62. The annular portion 61 supports each of the base ends of the projections 62 and is formed in a ring shape. The outer diameter of the annular portion 61 is greater than the inner diameter of the minimum diameter portion 512 and is about the same size or less than the inner diameter of the end of the constricting portion 511. The projection 62 projects towards the center of the annular portion 61 from the inner diameter side of the annular portion 61. The projection 62 is provided with a shaft 621 and a conical portion 542 as was the case in the projection 54 of the first embodiment. The four projections 62 are arranged face to face with one another to form the central gap 65 and the slits 64.

The second narrowing portion 60 requires processing of the projections 62 and precise adjustment of the central gap 63 and the slits 64. In the present embodiment, the second narrowing portion 60 is configured as a separate component from the flow path forming member 43 and thus, the second narrowing portion 60 can be manufactured separately from the flow path forming member 43. It is thus, possible to simplify the manufacturing of the second narrowing portion 60.

Figure 8A:
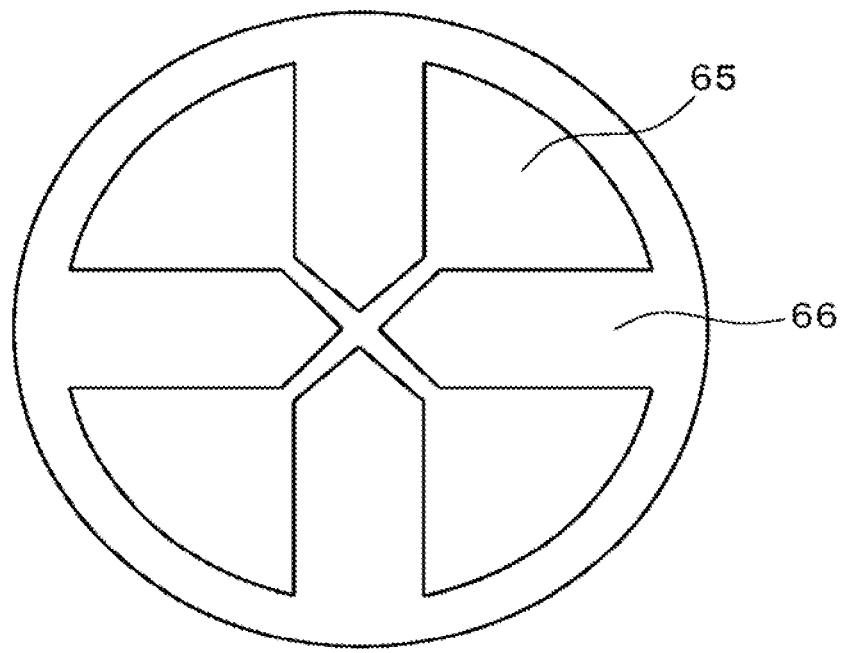
FIGS. 8A and 8B pertain to the third embodiment and illustrate the second narrowing portion being manufactured by etching where
Figure 8B:
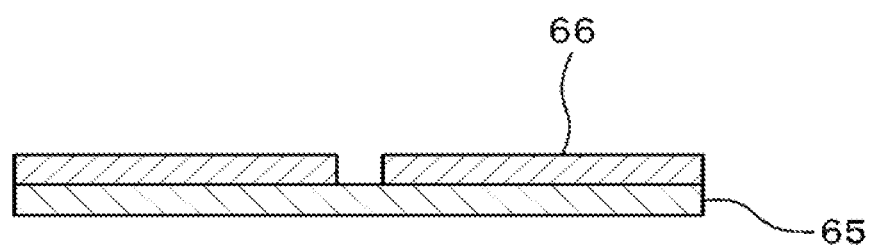

The second narrowing portion 60 may be manufactured by an etching process for example. In such case, the manufacturing method of the electromagnetic valve 40 includes a step of forming the second narrowing portion 60 by etching a metal material. That is, as shown in FIGS. 8A and 8B, a protective mask 66 is disposed over the upper surface of a base material 65 formed of a plate shaped metal material such as a stainless steel for example. The protective mask 66 is formed into the shape of the annular portion 61 and the projection 62 of the second narrowing portion 60.

The base material 65 having the protective mask 66 placed thereabove is dipped in a liquid that dissolves the base material 65 for example. As a result, portions of the base material 65 not covered by the protective mask 66 are etched to form the second narrowing portion 60. Alternatively, a sandblasting process may be performed for example in which a polishing agent such as fine sand is blown onto the base material 65 having the protective mask 66 disposed thereabove. Plural second narrowing portions 60 may be manufactured at the same time in a batch process for example. By manufacturing the second narrowing portion 60 by an etching process as described above, the second narrowing portion 60 can be mass produced at high precision and relatively low cost.

Figure 9A:
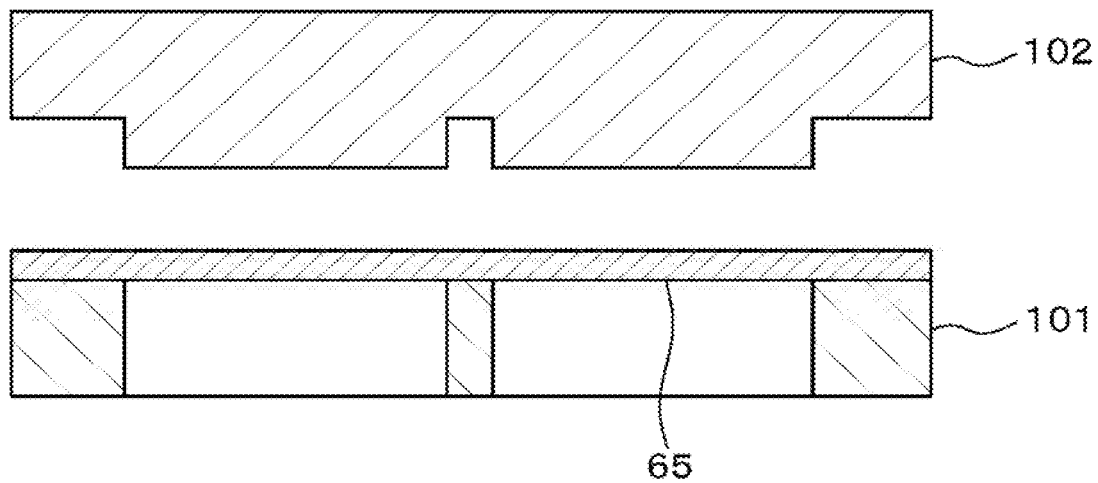
FIGS. 9A and 9B pertain to the third embodiment and illustrate the second narrowing portion being manufactured by cold forging where
Figure 9B:
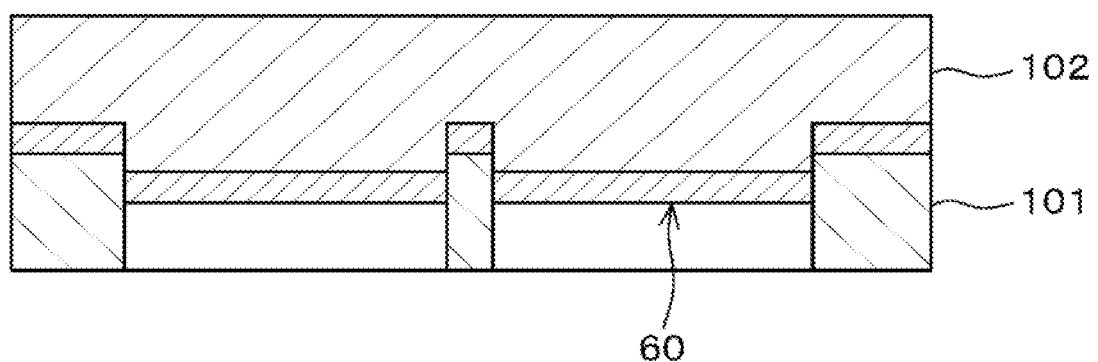

The second narrowing portion 60 may be manufactured by a cold forcing process for example. In such case, the manufacturing method of electromagnetic valve 40 includes a step of forming the second narrowing portion 60 by cold forging a metal material. That is, a base material 65 formed of a plate shaped metal material such as a stainless steel for example is punched out by a lower die 101 and an upper die 102 as shown in FIGS. 9A and 9B. The lower die 101 and the upper die 102 have dies for punching out the annular portion 61 and the projections 62 of the second narrowing portion 60 formed thereto. Thus, the annular portion 61 and the projections 62 of the second narrowing portion 60 are integrally punched out to form the second narrowing portion 60. Plural second narrowing portions 60 can be formed simultaneously by, for example, a batch process in this case as well. By manufacturing the second narrowing portion 60 by a cold forging process, the second narrowing portion 60 can be mass produced at high precision and relatively low cost.

Figure 10:
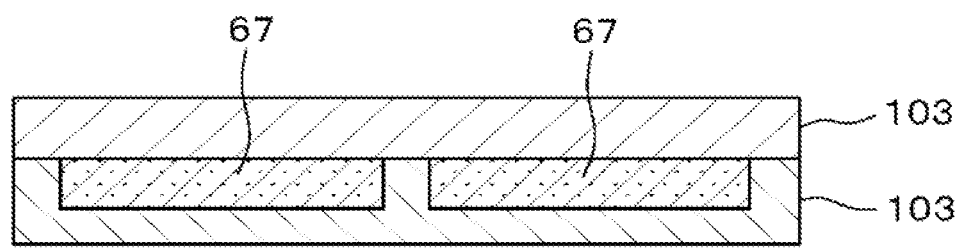
FIG. 10 pertains to the third embodiment and is a cross sectional view illustrating the second narrowing portion being manufactured by molding.

Further, the second narrowing portion 60 may be manufactured by molding a carbon graphite material for example. In such case, the manufacturing method of electromagnetic valve 40 includes a step of forming the second narrowing portion 60 by molding a carbon graphite material. That is, as shown in FIG. 10, carbon graphite powder 67 for example is placed in a molding die 103 and baked. As a result, the annular portion 61 and the projection 62 of the second narrowing portion 60 are molded integrally to form the second narrowing portion 60. By manufacturing the second narrowing portion 60 by molding a carbon graphite material, the second narrowing portion 60 can be mass produced at high precision and relatively low cost.

Fourth Embodiment

Figure 11:
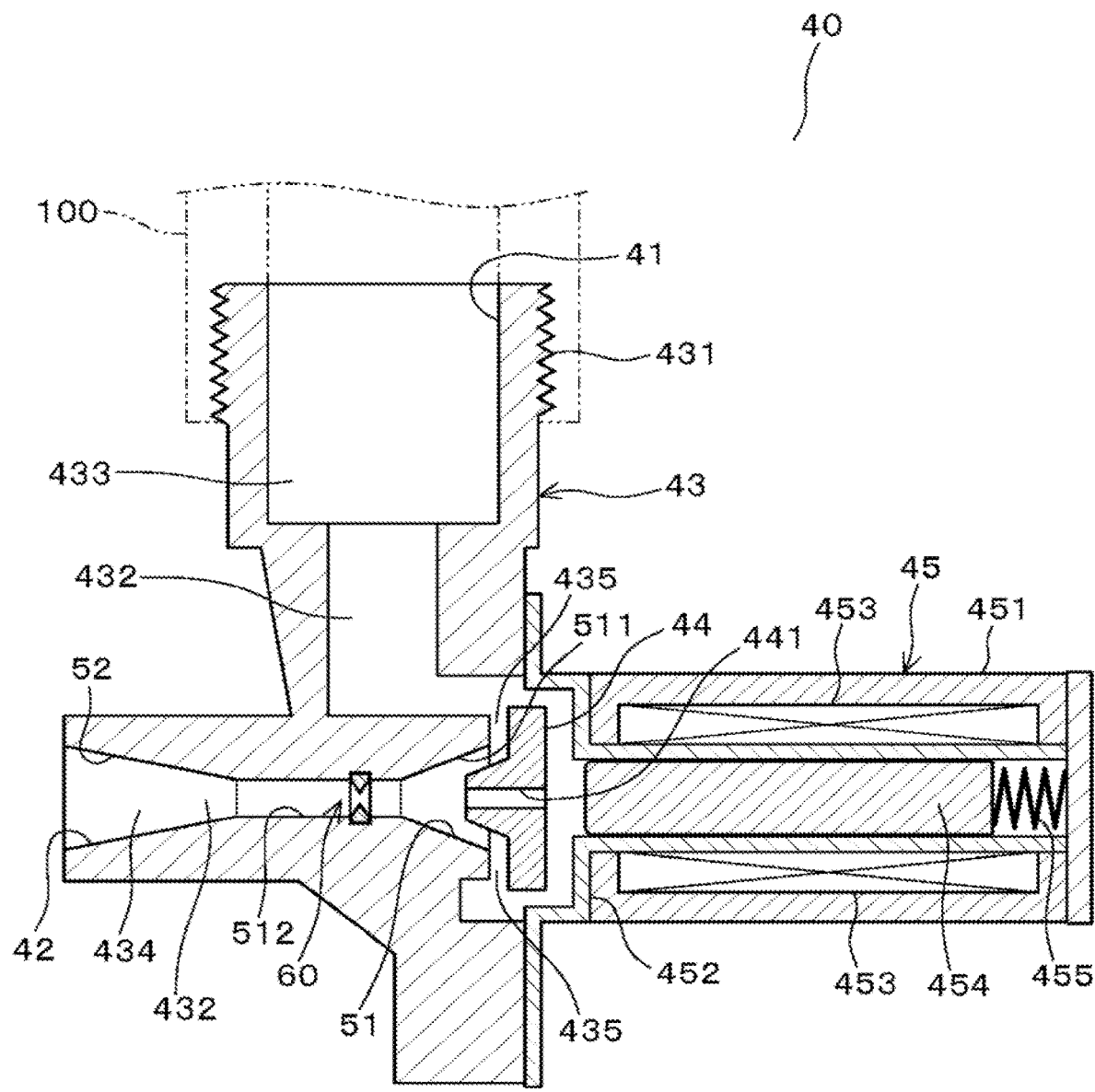
FIG. 11 illustrates one example of the liquid electromagnetic valve according to a fourth embodiment.

Next, a description will be given on a fourth embodiment with reference to FIG. 11.

The electromagnetic valve 40 of the fourth embodiment is provided with the second narrowing portion 60 as was the case in the third embodiment. In the fourth embodiment, the second narrowing portion 60 is provided in the flow path forming member 43 by being insert molded into the flow path forming member 43. In this case, the second narrowing portion 60 is provided midway of the minimum diameter portion 512. According to such configuration, the second narrowing portion 60 subjected to high pressure can be secured firmly with respect to the flow path forming member 43. It is thus, possible to prevent the second narrowing portion 60 from moving from a predetermined installation site.

Fifth Embodiment

Figure 12:
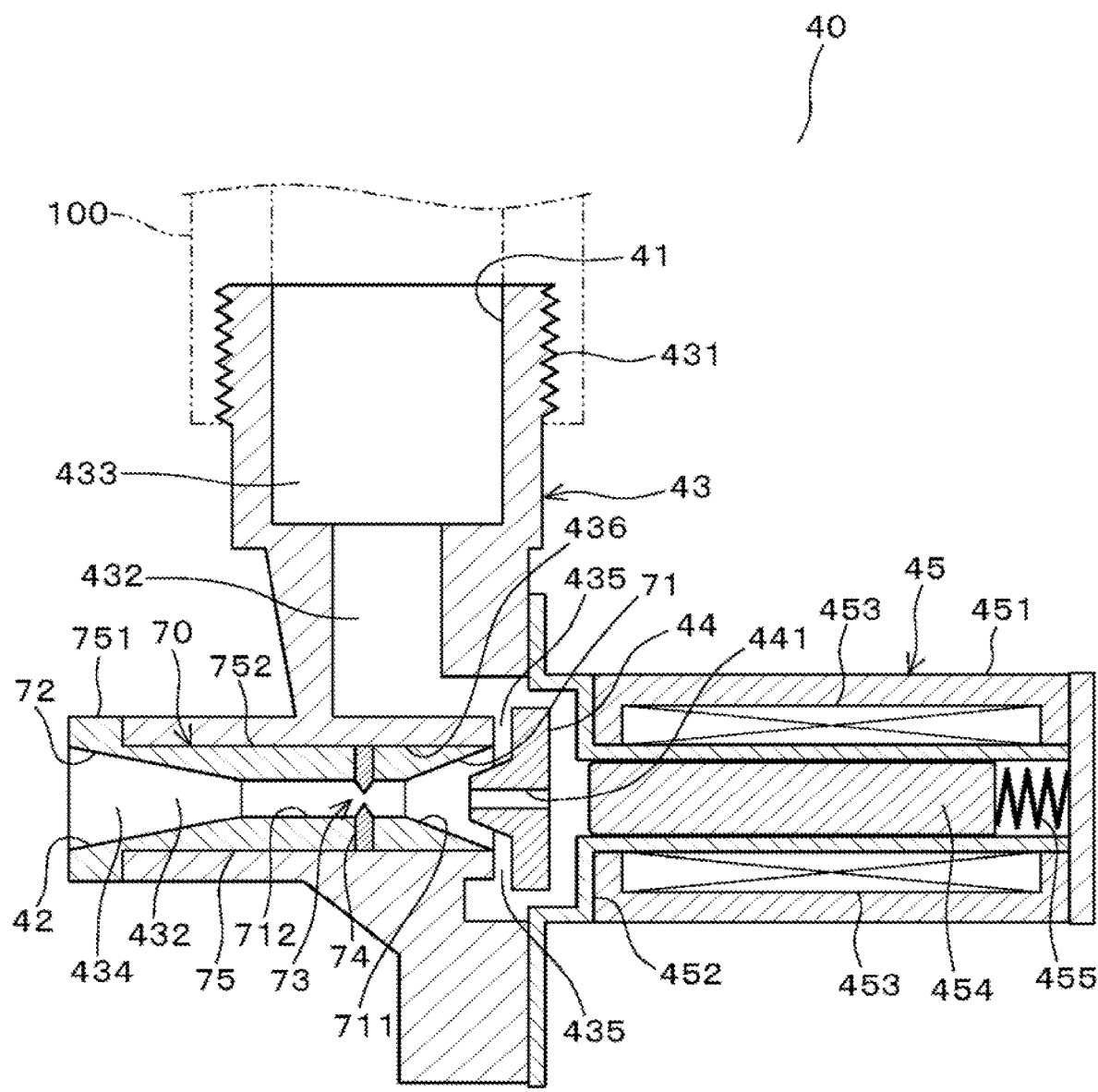
FIG. 12 illustrates one example of the liquid electromagnetic valve according to a fifth embodiment.

Next, a description will be given on a fifth embodiment with reference to FIG. 12.

The electromagnetic valve 40 of the fifth embodiment is provided with minute bubble generator 70 instead of the minute bubble generator 50 of the foregoing embodiments. The minute bubble generator 70 is separate from the flow path forming member 43, that is, formed as a separate component from the flow path forming member 43. The minute bubble generator 70 is attached to the flow path forming member 43 by being press fitted to the flow path forming member 43.

More specifically, the minute bubble generator 70 is provided with a generator main body 75. The generator main body 75 is formed as a stepped cylinder integrally provided with a large diameter portion 751 and a small diameter portion 752. The minute bubble generator 70 is provided with a first narrowing portion 71, a widening portion 72, and a second narrowing portion 73 as was the case in the minute bubble generator 50. The first narrowing portion 71, the widening portion 72, and the second narrowing portion 73 are provided inside the generator main body 75. The first narrowing portion 71 functionally corresponds to the first narrowing portion 51 of the minute bubble generator 50. The widening portion 72 functionally corresponds to the widening portion 52 of the minute bubble generator 50. The second narrowing portion 73 functionally corresponds to the second narrowing portion 53 of the minute bubble generator 50.

The second narrowing portion 73 is provided at the minimum diameter portion 712 of the first narrowing portion 71. The second narrowing portion 73 is configured by plural, in this case, four projections 74 projecting toward the central portion of the flow path 432 from the peripheral wall of the minimum diameter portion 712. The projections 74 functionally correspond to the projections 54. The projections 74 are press fitted into the inner side of the generator main body 75 from the outer side of the generator main body 75. Alternatively, the projections 74 may be threaded into the inner side of the generator main body 75 from the outer side of the generator main body 75. Further, the projections 74 may be formed integrally with the generator main body 75.

The second narrowing portion 73 is disposed so that the tips of the projections 74 are arranged face to face with one another with spacing therebetween as was the case in the above described second narrowing portion 53 and the second narrowing portion 60. As a result, a central gap and slits are formed at the central portion of the flow path 432 as was the case in the above described second narrowing portion 53 and the second narrowing portion 60 though not shown in detail.

The flow path forming member 43 is provided with an insert portion 436. The insert portion 436 is provided in the downstream side of the opening-closing member 44 and the peripheral wall of the insert portion 436 is formed in the shape of a smooth cylinder. The outer diameter of the large diameter portion 751 is greater than the inner diameter of the insert portion 436. The outer diameter of the small diameter portion 752 is slightly greater than the inner diameter of the insert portion 436. The outer surface of the small diameter portion 752 is formed as a smooth surface. The small diameter portion 752 and insert portion 436 are designed to establish for example an interference fitting relation with one another. The minute bubble generator 70 is attached to the flow path forming member 43 by press fitting the small diameter portion 752 to the inner side of the insert portion 436.

The electromagnetic valve 40 is capable of discharging liquid containing minute bubbles as was the case in the foregoing embodiments. Further, the minute bubble generator 70 is configured as a separate component from the flow path forming member 43. It is thus, possible to manufacture the minute bubble generator 70 and the flow path forming member 43 separately. As a result, the manufacturing of the minute bubble generator 70 can be simplified.

Further, when the minute bubble generator 70 is not attached, the electromagnetic valve 40 of the present embodiment functions as a normal electromagnetic valve that is not provided with a minute bubble generating function. Thus, it is possible in the present embodiment to attach the minute bubble generator 70 when needed at a later time. As a result, it is possible to provide more choices to the user as to whether to add functions by the attachment of the minute bubble generator 70 or the timing in which the minute bubble generator 70 is attached.

Sixth Embodiment

Figure 13:
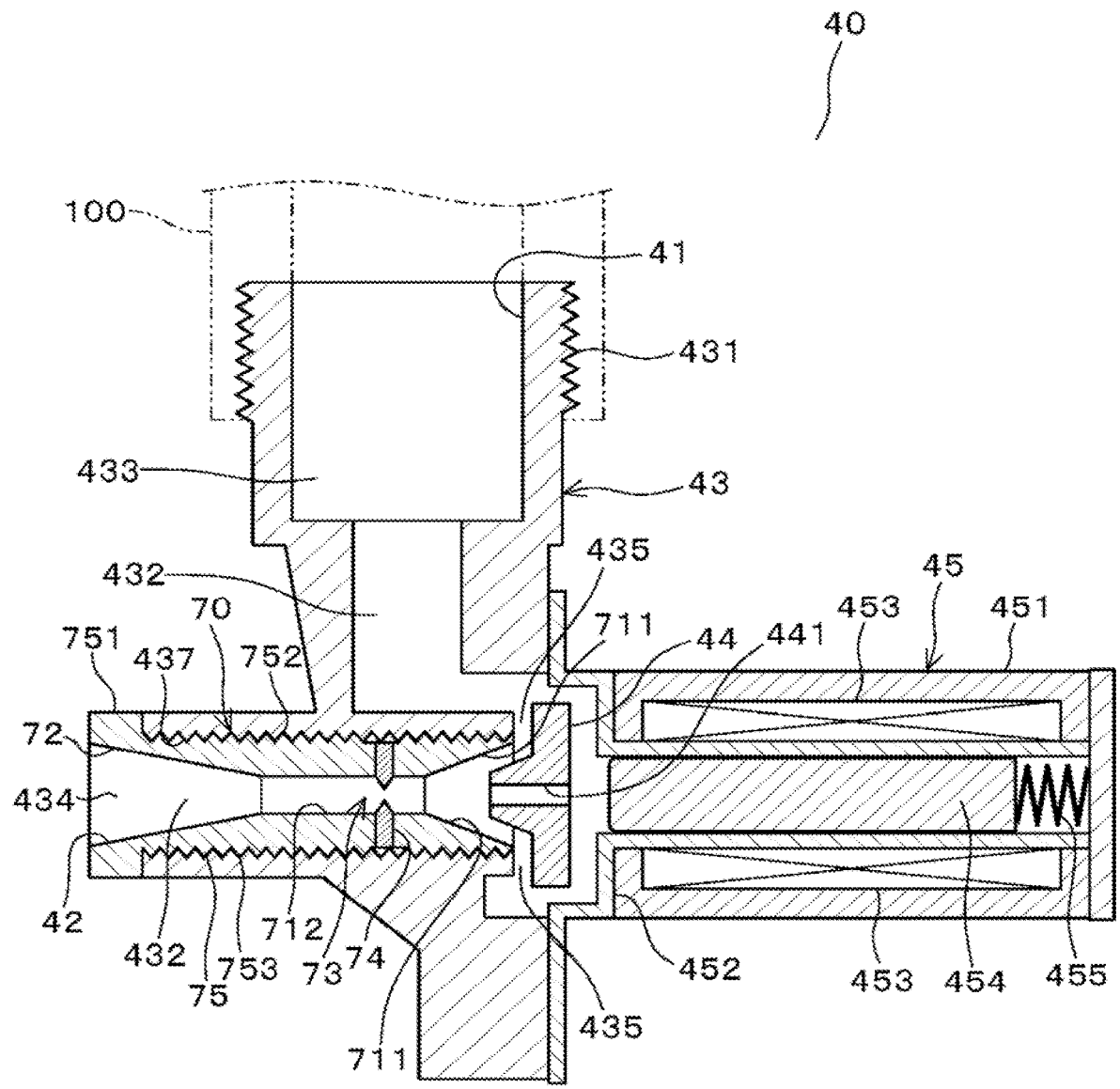
FIG. 13 illustrates one example of the liquid electromagnetic valve according to a sixth embodiment.

Next, a description will be given on a sixth embodiment with reference to FIG. 13.

In the sixth embodiment, the minute bubble generator 70 is provided with a male thread 753 formed on the outer surface of the small diameter portion 752. The flow path forming member 43 is provided with a female thread 437 instead of the insert portion 436 of the fifth embodiment. The female thread 437 is capable of being threaded with the male thread 753 and is provided in the downstream side of the opening-closing member 44. The minute bubble generator 70 is detachably attached to the flow path forming member 43 by the male thread 753 being threaded with the female thread 437.

According to the above described configuration, operation and effect similar to those of the fifth embodiment can be obtained. Further, the minute bubble generator 70 is detachably attached to the flow path forming member 43 by thread engagement. It is thus, possible to simplify attachment/detachment of the minute bubble generator 70 to/from the flow path forming member 43.

Seventh Embodiment

Figure 14:
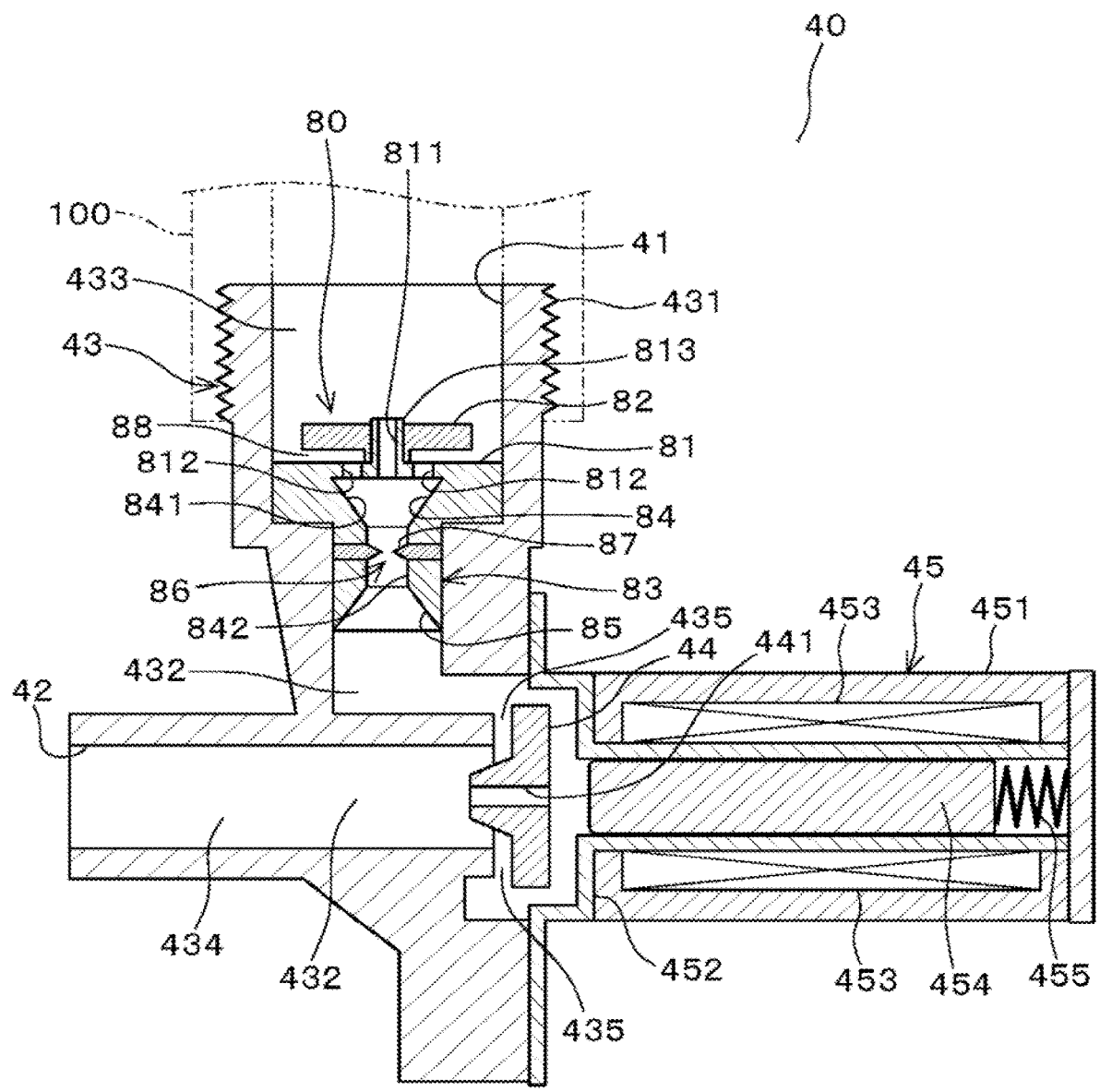
FIG. 14 illustrates one example of the liquid electromagnetic valve according to a seventh embodiment.

Next, a description will be given on a seventh embodiment with reference to FIG. 14.

The electromagnetic valve 40 of the seventh embodiment is provided with a flow rate regulator 80. The flow rate regulator 80 makes adjustments in the flow rate of liquid flowing through the flow path 432 and is provided in the flow-in portion 433 in the upstream side of the opening-closing member 44 for example. The flow rate regulator 80 is disposed inside the flow path forming member 43 by being inserted into the flow path forming member 43 from the inlet 41 of the electromagnetic valve 40 for example. The flow rate regulator 80 is not fixed inside the flow path forming member 43 but is rendered detachable from the inside of the flow path forming member 43.

The flow rate regulator 80 is integrally provided with a minute bubble generator 83. The peripheral wall of the flow-out portion 434 in the flow path forming member 43 is formed in a cylindrical shape. The flow rate regulator 80 is provided with a regulator main body 81 and a valve body 82. The regulator main body 81 is formed of a rigid material such as synthetic resin or metal. The regulator main body 81 is formed as a stepped cylinder as a whole. A first narrowing portion 84, a widening portion 85, and a second narrowing portion 86 are provided inside the regulator main body 81. The first narrowing portion 84 functionally correspond to the first narrowing portion 51 of the minute bubble generator 50. The widening portion 85 functionally correspond to the widening portion 52 of the minute bubble generator 50. The second narrowing portion 86 functionally correspond to the second narrowing portion 53 of the minute bubble generator 50. The first narrowing portion 84 is configured by a constricting portion 841 and a minimum diameter portion 842.

The second narrowing portion 86 is provided at the minimum diameter portion 442 of the first narrowing portion 84. The second narrowing portion 86 is configured by plural, in this case, four projections 87 projecting toward the central portion of the flow path 432 from the peripheral wall of the minimum diameter portion 842. The projections 87 functionally correspond to the projections 54. The projections 87 are press fitted into the inner side of the regulator main body 81 from the outer side of the regulator main body 81. The projections 87 may be threaded into the inner side of the regulator main body 81 from the outer side of the regulator main body 81. The projections 87 may be formed integrally with the regulator main body 81.

The regulator main body 81 is provided with a first hole 811 and a second hole 812. The first hole 811 is provided on the inner side of a cylindrical portion 813 projecting cylindrically from a central portion of a surface of the regulator main body 81 in the inlet 41 side and extends through the surface of the regulator main body 81 in the inlet 41 side to communicate with the first narrowing portion 84. Plural second holes 812 are provided around the first hole 811 and extends through the surface of the regulator main body 81 in the inlet 41 side to communicate with the first narrowing portion 84.

The valve body 82 is formed into a disc shape by an elastic material such as rubber. The cylindrical portion 813 of the regulator main body 81 extends through the central portion of the valve body 82. The valve body 82 is attached to the regulator main body 81 with a space 88 defined between itself and the peripheral wall of the flow-in portion 433 and the surface of the regulator main body 81 in the inlet 41 side.

When a liquid from an external liquid source flows into the flow-in portion 433 through the inlet 41, pressure of the liquid acts on the valve body 82. When the pressure of the liquid supplied into the flow-in portion 433 is less than a predetermined pressure, the valve body 82 does not block the second holes 812 since the elastic force of the valve body 82 overcomes the pressure of the liquid. In such case, the liquid supplied into the flow-in portion 433 passes through the first hole 811 and through the second holes 812 by passing through space 88.

On the other hand, when the pressure of the liquid supplied into the flow-in portion 433 exceeds the predetermined pressure, the pressure of the liquid overcomes the elastic force of the valve body 82. Thus, the valve body 82 elastically deforms in a direction to contact the regulator main body 81 with the central portion of the valve body 82 serving as a fulcrum. The valve body 82 blocks the space 88 and the second holes 812 when the valve body 82 contacts the regulator main body 81. Thus, the liquid supplied into the flow-in portion 433 will not be able to pass through the second holes 812. As a result, the flow rate of the liquid passing through the regulator body 81 becomes limited. Thus, the flow rate regulator 80 is capable of adjusting the flow rate of the liquid passing through the flow rate regulator 80 when the pressure of the liquid supplied to the flow-in portion 433 exceeds the predetermined pressure.

The liquid passed through the first hole 811 or the second holes 812 passes through the minute bubble generator 83. In doing so, the minute bubble generator 83 generates minute bubbles having a diameter equal to or less than 50 µm in the liquid passing through the flow path 432. As a result, operation and effect similar to those of the foregoing embodiments can be obtained. The flow rate regulator 80 is not fixed inside the flow path forming member 43 but is rendered detachable from the inside of the flow path forming member 43. Thus, even when the minute bubble generator 83 built in to the flow rate regulator 80 breaks down, etc., it is possible to readily deal with such cases by replacing the flow rate regulator 80.

A liquid electromagnetic valve is normally provided with a flow rate regulator. Thus, by replacing the flow rate regulator originally provided in the existing electromagnetic valve with the flow rate regulator 80 of the present embodiment, it is possible to readily add minute bubble generating function to the existing electromagnetic valve.

Further, plural outlets 42 may be provided with respect to a single inlet 41 to provide plural parallelly arranged electromagnetic valves. That is, the flow path 432 may be divided into plural branches in the downstream side of the flow rate regulator 80 and the opening-closing member 44 as well as the drive portion 45 may be provided to each branch of the flow path. As a result, minute bubbles may be added to the liquid discharged from each of the plural outlets 42 with a single minute bubble generator 83.

Eighth Embodiment

Figure 15:
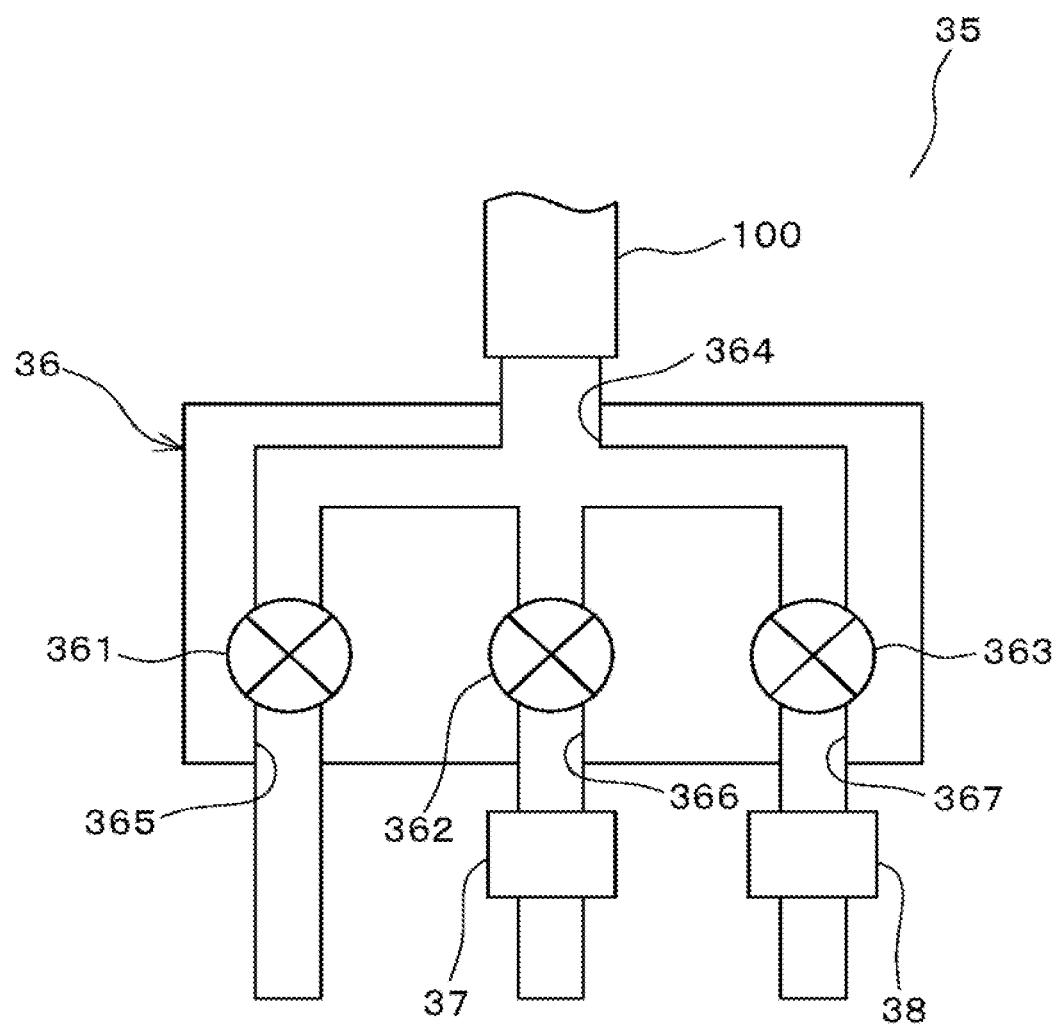
FIG. 15 pertains to an eighth embodiment and schematically illustrates one example of a water supplying device.

Next, a description will be given on an eighth embodiment with reference to FIG. 15.

The washing machines 10, 20 of the present embodiment is provided with a water supplying device 35 instead of the water supplying device 30 of the foregoing embodiments. The water supplying device 35 is provided with a water supplying valve unit 36, a detergent case 37, and a softener case 38. Detergent is supplied into the detergent case 37. Softener is supplied into the softener case 38. The water supplying valve unit 36 has plural liquid electromagnetic valves, for example, three liquid electromagnetic valves 361, 362, and 363 connected parallelly and is provided with a single inlet 364 and three outlets 365, 366, and 367. The electromagnetic valves 361, 362, and 363 are driven to open and close by a control signal of the controller not shown.

In the following description, the electromagnetic valve 361 is referred to as a first electromagnetic valve 361, the electromagnetic valve 362 is referred to as a second electromagnetic valve 362, and the electromagnetic valve 363 is referred to as a third electromagnetic valve 363. Further, the outlet 365 connected to the first electromagnetic valve 361 is referred to as a first outlet 365, the outlet 366 connected to the second electromagnetic valve 362 is referred to as a second outlet 366, and the outlet 367 connected to the third electromagnetic valve 363 is referred to as a third outlet 367.

The first electromagnetic valve 361 opens and closes the flow path connecting the inlet 364 and the first outlet 365. The second electromagnetic valve 362 opens and closes the flow path connecting the inlet 364 and the second outlet 366. The third electromagnetic valve 363 opens and closes the flow path connecting the inlet 364 and the third outlet 367. At least one of the three electromagnetic valves 361, 362, and 363 has a minute bubble generating function built in to it. In the present embodiment, the first electromagnetic valve 361 has the minute bubble generator 50 built in to it. The second electromagnetic valve 362 and the third electromagnetic valve 363 are conventional electromagnetic valves that do not have the minute bubble generating function built in to them.

The configuration of the inlet 364 is the same as the configuration of the inlet 41 of the water supplying device 30. That is, the water feeding hose 100 is connected to the inlet 364. Further, the first outlet 365 is connected directly into the water tubs 12, 22. Thus, the water discharged from the first outlet 365 is fed to the water tubs 12, 22 without dissolving the detergent and the softener. The water discharged from the first outlet 365 contains minute bubbles since it passes through the first electromagnetic valve 361.

The second outlet 366 is connected into the water tubs 12, 22 via the detergent case 37 storing the detergent. Thus, water discharged from the second outlet 366 after passing through the second electromagnetic valve 362 is fed into the water tubs 12, 22 after dissolving the detergent in the detergent case 37. The third outlet 367 is connected into the water tubs 12, 22 via the softener case 38 storing the softener. Thus, water discharged from the third outlet 367 after passing through the third electromagnetic valve 363 is fed into the water tubs 12, 22 after dissolving the softener in the softener case 38.

According to the above described configuration, it is possible to switch between a flow path passing through the electromagnetic valve 361 which is provided with the minute bubble generating function and flow paths passing through the electromagnetic valves 362, 363 which are not provided with the minute bubble generating function. It is thus, possible to generate minute bubbles whenever required at the desired timing. As a result, it is possible to improve the wash performance and the convenience of the washing machines 10, 20. The minute bubble generating function may be provided in either of the electromagnetic valves 361, 362, and 363.

Ninth Embodiment

Figure 16:
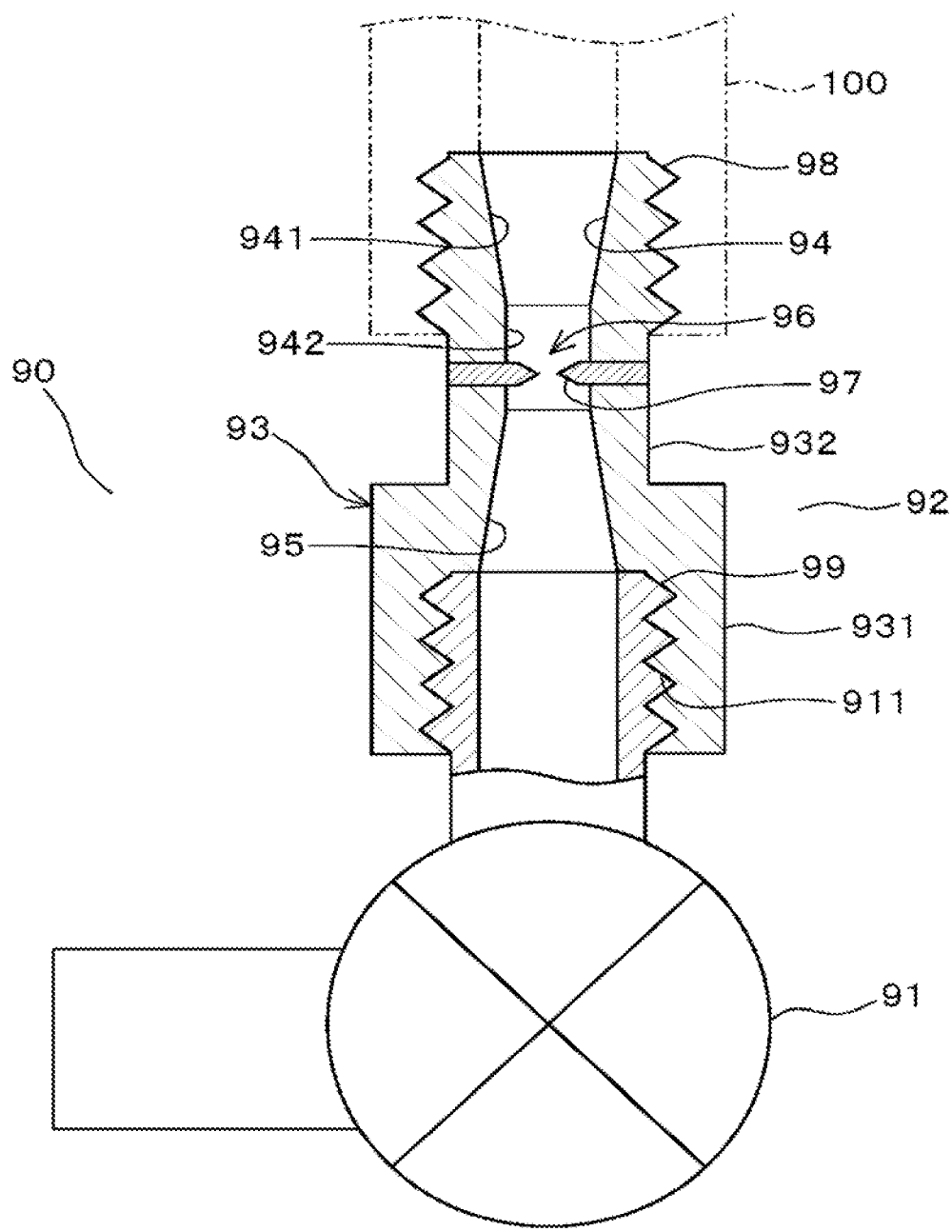
FIG. 16 illustrates one example of the liquid electromagnetic valve according to a ninth embodiment.

Next, a ninth embodiment will be described with reference to FIG. 16.

In the present embodiment, the washing machines 10, 20 are each provided with an electromagnetic valve 90 instead of the electromagnetic valve 40 of the foregoing embodiments. The electromagnetic valve 90 is provided with an electromagnetic valve main body 91 and a minute bubble generator 92. The electromagnetic valve main body 91 is a liquid electromagnetic valve which is not provided with the minute bubble generating function. The electromagnetic valve main body 91 is provided with a mounting thread 911 around the outer side of an inlet portion leading to the interior of the electromagnetic valve main body 91. The configuration of the mounting thread 911 is the same as the configuration of the mounting thread 431 of the foregoing embodiments. That is, the water feeding hose 100 can be mounted on the mounting thread 911.

The minute bubble generator 92 is configured as a separate component from the electromagnetic valve main body 91. The minute bubble generator 92 is provided with a generator main body 93. The generator main body 93 is formed as a stepped cylinder integrally provided with a large diameter portion 931 and a small diameter portion 932. The minute bubble generator 92 is provided with a first narrowing portion 94, a widening portion 95, and a second narrowing portion 96 as was the case for the minute bubble generator 50. The first narrowing portion 94, the widening portion 95, and the second narrowing portion 96 are provided inside the generator main body 93. The first narrowing portion 94 functionally corresponds to the first narrowing portion 51 of the minute bubble generator 50. The widening portion 95 functionally corresponds to the widening portion 52 of the minute bubble generator 50. The second narrowing portion 96 functionally corresponds to the second narrowing portion 53 of the minute bubble generator 50. Further, the first narrowing portion 94 is configured by a constricting portion 941 and a minimum diameter portion 942.

The second narrowing portion 96 is provided at the minimum diameter portion 942 of the first narrowing portion 94. The second narrowing portion 96 is configured by plural, in this case, four projections 97 projecting toward the central portion of the flow path 432 from the peripheral wall of the minimum diameter portion 942. The projections 97 functionally correspond to the projections 54, etc. The projections 97 are press fitted into the inner side of the generator main body 93 from the outer side of the generator main body 93. The projections 97 may be threaded into the inner side of the generator main body 93 from the outer side of the generator main body 93. The projections 97 may be formed integrally with the generator main body 93.

The minute bubble generator 92 is provided with a first mounting thread 98 and a second mounting thread 99. The first mounting thread 98 is a male thread provided on the outer surface of the small diameter portion 932. The configuration of the first mounting thread 98 is the same as the configurations of the mounting thread 431 of the foregoing embodiments and the mounting thread 911 of the electromagnetic valve main body 91. That is, the water feeding hose 100 can be mounted on the first mounting thread 98. The second mounting thread 99 is a female thread provided on the inner surface of the large diameter portion 931. The second mounting thread 99 is configured to be capable of being threaded with the mounting thread 911 of the electromagnetic valve main body 91. That is, the second mounting thread 99 is formed in the same pitch as the female thread provided at the base end of the water feeding hose 100. The minute bubble generator 92 is detachably attached to the electromagnetic valve main body 91 by threading the mounting thread 911 of the electromagnetic valve main body 91 into the inner side of the second mounting thread 99.

According to the above described configuration, even in case the electromagnetic valve main body 91 is an existing electromagnetic valve which is not provided with the minute bubble generating function, the minute bubble generator 92 can be readily mounted between the water feeding hose 100 and the electromagnetic valve main body 91. Thus, it is possible to readily add the minute bubble generating function to the existing electromagnetic valve. Further, the minute bubble generator 92 is detachably attached to the electromagnetic valve main body 91. Thus, even when the minute bubble generator 92 breaks down, etc., it is possible to deal with such cases by replacing the minute bubble generator 92.

The minute bubble generator 92 of the present embodiment may be provided between the inlet 364 and the water feeding hose 100 of the eighth embodiment described above. In such case, the first electromagnetic valve 361 can be rendered free of minute bubble generating function like electromagnetic valves 362 and 363. According to such configuration, minute bubbles can be added to the water discharged from each of the plural outlets 365, 366, and 367 with a single minute bubble generator 92.

In the forgoing embodiments, the liquid supplied to the liquid electromagnetic valve 40 is not limited to water. Further, the liquid electromagnetic valve 40 is not limited to a diaphragm type.

Still further, the liquid electromagnetic valve 40 is not limited to use in the field of washing machines but may be used for example in a household and industrial dish washer and high pressure washer; substrate cleaning apparatus used in semiconductor manufacturing; and a water purification apparatus.

The method of generating minute bubbles is not limited to the Venturi tube method described above.

Further, the liquid electromagnetic valve 40 can be widely used in fields other than washing objects and water purification.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:
1. A liquid electromagnetic valve comprising:
an inlet connected to an external liquid source;
an outlet discharging a liquid entering from the inlet;
a flow path forming member having a flow path connecting the inlet and the outlet formed thereto;
an opening-closing member capable of opening and closing the flow path;

a drive portion opening and closing the opening-closing member based on a control performed by an external element; and a minute bubble generator provided in the flow path and having plural narrowing portions for adding minute bubbles to a liquid passing through the flow path by narrowing the flow path in plural stages, wherein the minute bubble generator includes:

a first narrowing portion that continuously reduces a cross sectional area of the flow path toward a downstream side of the flow path from an upstream side of the flow path; and a second narrowing portion that is provided in a portion of the first narrowing portion having the smallest cross sectional area and that reduces the cross sectional area of the flow path to become locally smaller than the smallest cross sectional area of the first narrowing portion by dividing the flow path into plural regions by slits provided at a central portion of the flow path.

2. The liquid electromagnetic valve according to claim 1, wherein the first narrowing portion is formed integrally with the flow path forming member.

3. The liquid electromagnetic valve according to claim 1, wherein the second narrowing portion is a separate component from the flow path forming member and is provided inside the flow path forming member by being inserted into the flow path forming member.

4. The liquid electromagnetic valve according to claim 1, wherein the second narrowing portion is a separate component from the flow path forming member and is provided inside the flow path forming member by being insert molded to the flow path forming member.

5. The liquid electromagnetic valve according to claim 1, wherein the minute bubble generator is a separate component from the flow path forming member and is mounted to the flow path forming member by being press fitted to the flow path forming member.

6. The liquid electromagnetic valve according to claim 1, wherein the minute bubble generator is a separate component from the flow path forming member and the narrowing portions are formed integrally with a main body of the minute bubble generator.

7. The liquid electromagnetic valve according to claim 1, wherein the minute bubble generator is provided in an upstream side of the opening-closing member.

8. The liquid electromagnetic valve according to claim 7, further comprising a flow rate regulator that is provided in the upstream side of the opening-closing member and that makes adjustments in a flow rate of a liquid flowing through the flow path, wherein the minute bubble generator is provided integrally with the flow rate regulator.

9. A washing machine provided with the liquid electromagnetic valve according to claim 1.

10. A washing machine comprising:

a water tub;

a water supplying case provided midway of a flow path for supplying water into the water tub from an external water source; and a minute bubble generator provided in an upstream side of the water supplying case and located midway of the flow path, the minute bubble generator having plural narrowing portions for adding minute bubbles to water passing through the flow path by narrowing the flow path in plural stages, wherein the minute bubble generator includes:

a first narrowing portion that continuously reduces a cross sectional area of the flow path toward a downstream side of the flow path from an upstream side of the flow path; and a second narrowing portion that is provided in a portion of the first narrowing portion having the smallest cross sectional area and that reduces the cross sectional area of the flow path to become locally smaller than the smallest cross sectional area of the first narrowing portion by dividing the flow path into plural regions by slits provided at a central portion of the flow path.

11. The washing machine according to claim 10 wherein the narrowing portions are formed integrally molded with a main body of the minute bubble generator.

* * * * *